(12) United States Patent
Borish et al.

(10) Patent No.: US 11,630,439 B2
(45) Date of Patent: Apr. 18, 2023

(54) CONTINUOUS TOOLPATHS FOR ADDITIVE MANUFACTURING

(71) Applicant: UT-Battelle, LLC, Oak Ridge, TN (US)

(72) Inventors: Michael C. Borish, Knoxville, TN (US); Alex C. Roschli, Knoxville, TN (US); Brian K. Post, Knoxville, TN (US); Phillip C. Chesser, Knoxville, TN (US); Seokpum Kim, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 344 days.

(21) Appl. No.: 16/842,274

(22) Filed: Apr. 7, 2020

(65) Prior Publication Data

US 2021/0055710 A1 Feb. 25, 2021

Related U.S. Application Data

(60) Provisional application No. 62/890,199, filed on Aug. 22, 2019.

(51) Int. Cl.
*G05B 19/4099* (2006.01)
*B29C 64/393* (2017.01)
(Continued)

(52) U.S. Cl.
CPC ........ *G05B 19/4099* (2013.01); *B29C 64/386* (2017.08); *B29C 64/393* (2017.08);
(Continued)

(58) Field of Classification Search
CPC ..... B29C 64/393; B29C 64/153; B22F 10/28; B22F 10/366; B22F 10/368; B22F 12/90;
(Continued)

(56) References Cited

U.S. PATENT DOCUMENTS 10,354,018 B2 7/2019 Savage et al.
10,399,280 B1 9/2019 Lensgraf et al.
(Continued)

FOREIGN PATENT DOCUMENTS

KR 20170112407 A * 10/2017 ............. B33Y 80/00

OTHER PUBLICATIONS

Ding, et al., "A tool-path generation strategy for wire and arc additive manufacturing", Int J Adv Manuf Technol (2014) 73:173-183 (Year: 2014).*
(Continued)

*Primary Examiner* — Thomas C Lee
*Assistant Examiner* — Michael Tang
(74) *Attorney, Agent, or Firm* — Warner Norcross + Judd LLP

(57) ABSTRACT

Toolpath generation for additive manufacturing systems involves operations on polygonal contours derived from a model for additively manufacturing a structure. One aspect involves modifying or creating a model to allow parts to be printed without starting and stopping the printing equipment by generating continuous toolpaths or toolpaths having a reduced number of isolated paths. Another aspect involves modifying a slicing engine to generate a continuous toolpath or toolpath having a reduced number of isolated paths based on a representation of an object to be additively manufactured. Another aspect involves selectively placing the gaps at alternating positions among the sliced layers to create a zippering effect.

7 Claims, 14 Drawing Sheets

(51) Int. Cl.
  G06T 19/20    (2011.01)
  B33Y 50/02    (2015.01)
  B33Y 50/00    (2015.01)
  B29C 64/386   (2017.01)
(52) U.S. Cl.
  CPC .............. *B33Y 50/00* (2014.12); *B33Y 50/02*
              (2014.12); *G06T 19/20* (2013.01); *G06T*
                                  *2219/2021* (2013.01)
(58) Field of Classification Search
  CPC ...... B22F 2999/00; B22F 10/36; B33Y 10/00;
                          B33Y 50/02; Y02P 10/25
  See application file for complete search history.

(56) References Cited

U.S. PATENT DOCUMENTS

| | | | | |
|---|---|---|---|---|
| 10,464,305 | B2 | 11/2019 | Inamura et al. | |
| 2014/0252684 | A1* | 9/2014 | Swanson | B29C 64/393 |
| | | | | 264/401 |
| 2014/0255647 | A1* | 9/2014 | Johnson | B33Y 80/00 |
| | | | | 428/116 |
| 2018/0326669 | A1* | 11/2018 | Chen | B29C 67/00 |
| 2019/0009472 | A1* | 1/2019 | Mark | B33Y 10/00 |
| 2020/0156309 | A1* | 5/2020 | Nellis | F28F 3/044 |
| 2020/0282497 | A1* | 9/2020 | Yamasaki | B23K 9/127 |
| 2021/0103268 | A1* | 4/2021 | Tang | G06F 30/20 |

OTHER PUBLICATIONS

Dreifus, et al., "Path Optimization Along Lattices in Additive Manufacturing Using the Chinese Postman Problem", 3D Printing and Additive Manufacturing vol. 4, No. 2, 2017 (Year: 2017).*

Choi, et al., "A topological hierarchy-based approach to toolpath planning for multi-material layered manufacturing", Computer-Aided Design 38 (2006) 143-156 (Year: 2006).*

Kim, Seokpum et al., "Graded infill structure of wind turbine blade accounting for internal stress in big area additive manufacturing", presented at CAMX Conference Proceedings, Dallas, TX, Oct. 15-18, 2018, pp. 1-10.

Dreifus, Gregory et al., "Path Optimization Along Lattices in Additive Manufacturing Using the Chinese Postman Problem", 3D Printing and Additive Manufacturing, vol. 4, No. 2, 2017, pp. 98-104.

Ding, Donghong et al., "A tool-path generation strategy for wire and arc additive manufacturing", International Journal of Advanced Manufacturing Technology, vol. 73, Apr. 11, 2014, pp. 173-183.

Dreifus, Gregory et al., "A Framework for Tool Path Optimization in Fused Filament Fabrication", SCF '17 proceedings of the 1st Annual ACM Symposium on Computational Fabrication, Cambridge, MA, Jun. 12-13, 2017, pp. 1-2.

Roschli, Alex et al., "Creating toolpaths without starts and stops for extrusion-based systems", presented at Proceedings of the 30th Annual International Solid Freeform Fabrication Symposium, Austin, TX, Aug. 12-14, 2019, pp. 1113-1125.

Mellor, Stephen et al., "Additive manufacturing: A framework for implementation", International Journal of Production Economics, vol. 149, Mar. 2014, pp. 194-201.

Gao, Wei et al., "The status, challenges, and future of additive manufacturing in engineering", Computer-Aided Design, vol. 69, Dec. 2015, pp. 65-89.

Adams, D. et al., "An implicit slicing method for additive manufacturing processes", Virtual and Physical Prototyping, vol. 13, No. 1, 2018, pp. 2-7.

Kim, Seokpum et al., "An integrated design approach for infill patterning of fused deposition modeling and its application to an airfoil", presented at SAMPE Conference Proceedings, Seattle, WA, May 22-25, 2017, pp. 2136-2148.

Love, Lonnie J. et al., "Breaking Barriers in Polymer Additive Manufacturing", presented at SAMPE Conference Proceedings, Baltimore, MD, May 18-21, 2015, pp. 1-17.

Collins, Charles R. et al., "A circle packing algorithm", Computational Geometry, vol. 25, 2003, pp. 233-256.

Stephenson, Kenneth, "Circle Packing: A Mathematical Tale", Notices of the AMS, vol. 50, No. 11, Sep. 2003, pp. 1376-1388.

Bowers, John C. et al., "Ma-Schlenker c-Octahedra in the 2-Sphere", Discrete & Computational Geometry, vol. 60, Jul. 2018, pp. 9-26.

Dwivedi, Rajeev et al., "Automated Torch Path Planning Using Polygon Subdivision for Solid Freeform Fabrication Based on Welding", Journal of Manufacturing Systems, vol. 23, No. 4, 2004, pp. 278-291.

Wilf, Herbert S., "Algorithms and Complexity", First Edition 1994, citing Internet Edition, Summer 1994, pp. 1-135.

Bollweg, Peter et al., "Surface-adaptive and Collision-avoiding Path Planning for Five-axis Milling", Forschungsbericht Nr., vol. 808, Jan. 2006, pp. 1-74.

Hodgson, Gary et al., "Infill Patterns and Density" and "Infill Optimization" topics in section entitled "Print Configurations" of Slic3r Manual, available at slic3r.org and available at least as of Jan. 22, 2020.

Ranellucci, Alessandro, "Tip: printing vases", posted on Slic3r, Open source 3D printing toolbox, available at https://slic3r.org/blog/tip-printing-vases/, dated Mar. 24, 2013, p. 1.

Ultimaker, "Mastering Cura", Professional 3D printing made accessible, available at https://web.archive.org/web/20180709200203/https://ultimaker.com/en/resources/21932-mastering-cura, available as of Jul. 9, 2018, pp. 1-33.

U.S. Appl. No. 16/750,631, filed Jan. 23, 2020.

* cited by examiner

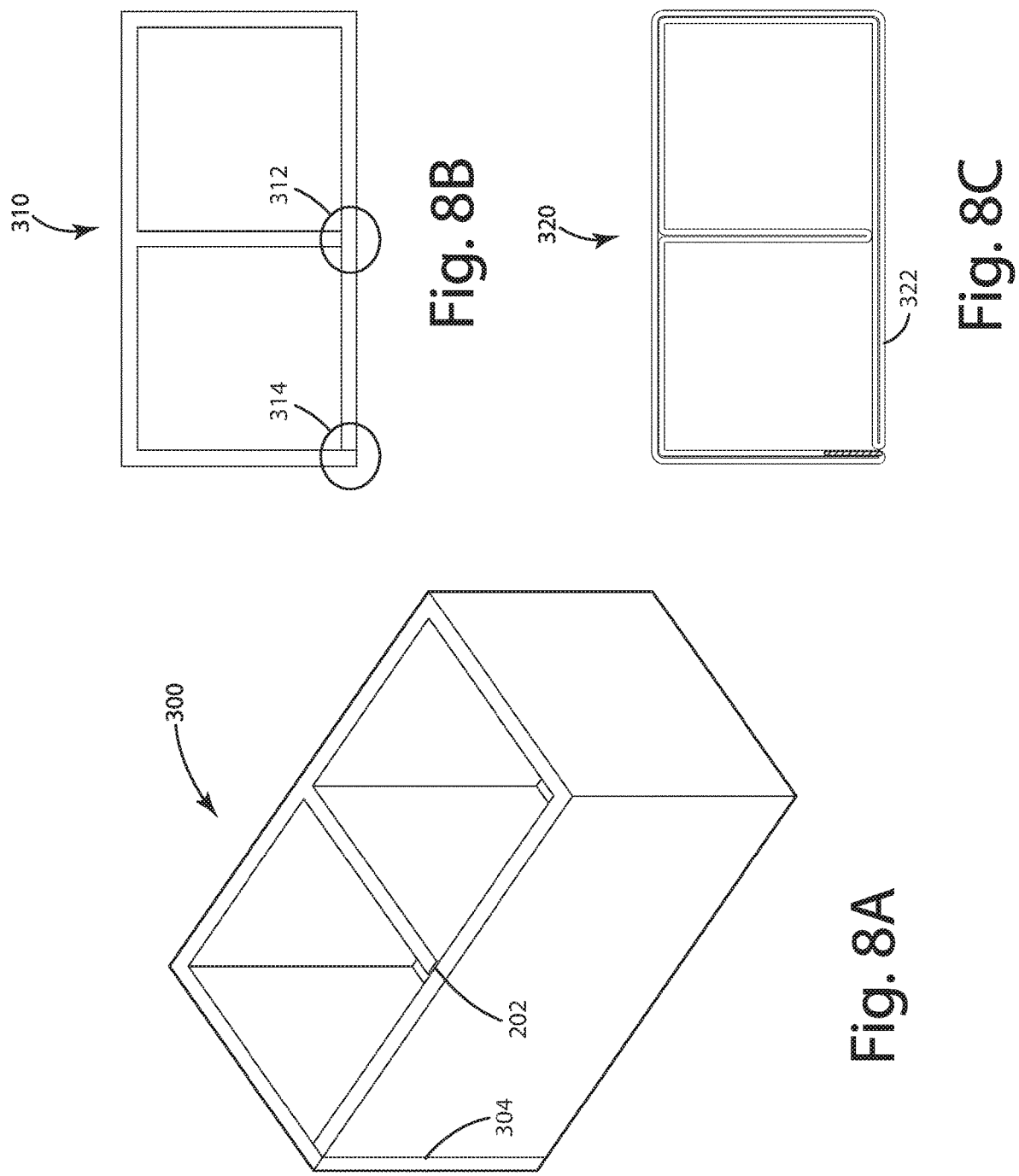

CONTINUOUS TOOLPATHS FOR ADDITIVE MANUFACTURING

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to deposition based additive manufacturing systems and methods for generating or revising 3D models and toolpaths, systems and methods for manufacturing an additive structure via a 3D model and toolpath, and the resultant additive structures themselves.

BACKGROUND OF THE INVENTION 3D printing typically utilizes slicing software to discretize 3D models into layers along an axis. Once sliced, the software determines the movements of the 3D printing equipment within each layer to print the 3D model layer by layer, typically referred to as a toolpath. The toolpaths are often saved in memory as G-Code, a well-known numerical control programming language. The toolpaths typically define the path of travel of the printer including stops, starts, and tip wipes to print each layer of the part. Starts, stops, and tip wipes can add as much as 10% to the total print time. As printed parts grow larger, so do total print times. 10% may be acceptable for some smaller print times, but can be a non-negligible and unacceptable amount of time for longer print jobs. For example, a 30-hour print is not uncommon, so an additional three hours from starts, stops, and tip wipes means an additional three hours of machine and operator costs, which can be significant, especially in aggregate.

Toolpath generation for extrusion-based additive manufacturing systems, often referred to as slicing, involves operations on polygonal contours that are derived from a three-dimensional model, for example as represented by a stereolithography (STL) file. Slicing can generate multiple paths per layer (both closed-loop and open-loop) that fill the space outlined by the polygon(s). In the course of printing a layer, the extruder is forced to start and stop, the tip is wiped, and the extruder is forced to travel between paths without printing, referred to as empty travel or a travel move. Time the printer spends moving without printing is essentially wasted. In addition, the start/stop point, known as the seam, is often a blemish on the surface of the part that not only decreases part aesthetics but can also contribute to weakening material properties of the part.

The standard method for generating extrusion-based system toolpaths is a purely geometric-based approach often referred to as "slicing". The name slicing comes from the process of slicing the file to be printed into layers. A representation of a part, which originates in computer aided design (CAD) software (such as Solidworks or Autodesk Fusion 360), is exported from the CAD software as an stereolithography (STL) file. An STL file represents the surface geometry of the CAD file, typically using triangles to approximate all curves and features. This STL file is loaded into the slicing software to be sliced into layers.

Slicing works by intersecting a horizontal plane (in plane with the build surface) with the STL file and then incrementing the height by the desired printing layer height. Each slice becomes a layer represented as a polygon or polygons. A simple example of this can be seen in the FIG. 6B, which shows one slice of a simple 3D model. The next step of slicing is to fit toolpaths to the layer to fill the layer. Toolpaths are generated specific to the user-defined settings in the slicer such as bead width, infill density, and number of perimeters, to name a few. Closed-loop paths are generated first by polygon offsets of the layer's bounding polygon. For example, this is illustrated in FIGS. 6A-6C, where FIG. 6A depicts a perspective view of a simple 3D model in FIG. 6A, FIG. 6B shows a slice of the model generated from a conventional slicing algorithm, and FIG. 6C shows representative toolpaths generated by the conventional slicing algorithm. In particular, in this example the slicing algorithm generates three paths: a rectangular perimeter or bounding path 102, and two inset square paths 104, 106 offset from the bounding rectangle. Once all closed loop paths are generated, usually referred to as perimeters and insets, skins and infill are used to fill the remaining void, if appropriate. Skin and infill toolpaths can be generated in a variety of different ways, but the simplest approach is to apply a grid across the region to be filled and apply toolpaths to the grid. For simplicity's sake no skins or infill are depicted in FIG. 6C.

The final step of slicing is to output the toolpaths as additive manufacturing instructions, such as G-Code, which is code that represents the instructions for the machine about how to print the desired part. G-Code has some standardizations for common codes but is largely machine-specific. Each machine has its own unique hardware i/o that can be enabled and disabled as needed during the print. To be effective, the slicing software typically knows each system's capabilities and formats the G-Code output accordingly.

Generally, starts and stops occur because one toolpath ends, and the extruder cannot keep extruding while traveling to the next toolpath (or material would be deposited in undesired locations). The time spent moving between the end of one path and the start of the next, called travel movements or empty travel, slows down the print and wastes machine time. The start and stop point, known as the seam, often creates an ugly blemish on the surface of the part. The seam is not only rough, but it creates a weak joint in the part. At the start/stop point, the bead of polymer is disconnected. It's a butt joint where fibers don't flow across the joint, causing a significant loss of strength. As an example, the start of a path for a pellet-based extruder pauses, or slows movement, to build up pressure in the extruder so that the initial extrusion will bond to the substrate or previous layer. The end of the path has the opposite problem. The release of pressure as the extruder slows down causes material to drool out of the extruder nozzle. This can be addressed to some extent by moving slowly for the last few moves of the path or wiping the tip across the part, both of which take time.

Spiralized or vase-mode printing is one option available in some conventional slicing software. Specifically, spiralized printing is one way of slicing a stereolithographic (STL) file, typically derived from a computer-aided design (CAD) model, in a way that eliminates starts, stops, and tip wipes. It works by ignoring or destroying the interior of the model and only generating a continuous spiraling toolpath that traces the model's outer surface printing a wall only a single bead width thick. During a spiralized print, the printer equipment moves along the Z-axis at a continuous rate as opposed to adjusting the printer equipment at the end of each layer. There is no start or stop point on each layer and the whole model is printed as one continuous spiral. While current spiralizing methods of 3D printing can speed up printing, they have a number of limitations that make the methods primitive and impractical for many applications. Most notably, because the spiralized wall is only as thick as the bead-width, without the ability to have inset paths or infill, the resultant part has low structural integrity or stability, making it fragile or deformable. In addition, current methods of spiralized printing cannot handle overhangs exceeding 45 degrees, cannot include flat areas parallel to the build platform, and have issues producing a watertight seal. To date, the most advanced spiralized 3D printed objects have a simple exterior geometry and have mainly been confined to the small-scale 3D printing context.

Some workarounds to increase stability have been attempted. For example, some spiralized printing methods advocate printing a brim at the base of the model or over-extruding. However, these workarounds do not cure the underlying issues with current methods of spiralized printing and can introduce additional issues.

SUMMARY OF THE INVENTION

The present disclosure provides a system and method for improving additive manufacturing of an additive structure. One aspect is generally directed to making cuts in the representation of an object such that when sliced the generated toolpath for each layer is continuous or at least has a reduced number of isolated paths. Another aspect is generally directed to zippering where the locations of the cuts in the sliced dimension are selected to change the position of the void among the layers of the part. These aspects can be utilized with spiralized printing to additively manufacture or print an additive structure with a single continuous toolpath.

In general, one innovative aspect of the subject matter described in this specification can be embodied in a method of generating a toolpath for additively manufacturing an object. The method can include obtaining a 3D digital representation of the object. The 3-D representation of the object can include a continuous cross section perimeter and a segment intersecting the continuous cross section perimeter at a first and a second intersection, wherein the first and second intersections are different. The method can also include editing the 3-D digital representation of the object by inserting a gap between the segment and the continuous cross section perimeter at the first intersection, slicing, with slicing software, the 3-D digital representation of the object with the gap, and generating, with slicing software, a plurality of toolpaths for additively manufacturing the object from the 3-D digital representation of the object with the gap, such that at least one of the plurality of toolpaths has a reduced number of isolated paths relative to a plurality of toolpaths that would be generated by slicing software for additively manufacturing the object from the 3-D digital representation of the object without the gap.

The foregoing and other embodiments can each optionally include one or more of the following features, alone or in combination. In particular, one embodiment includes all the following features in combination.

In some embodiments, the method can include one of the plurality of toolpaths including a continuous toolpath that includes a first section of the continuous toolpath extending from the second intersection to the gap along the segment, a second section of the continuous toolpath extending from the first section extending adjacent the gap, a third section of the continuous toolpath extending from the second section and extending adjacent to the first section along the segment from the gap to the second intersection, and a fourth section of the continuous toolpath extending from the third section along the entire continuous cross section perimeter from one side of the second intersection to the other side of the second intersection to complete the continuous layer toolpath at the first section of the continuous toolpath.

In some embodiments, the method can include the 3-D digital representation of the object including a plurality of adjacent layers, layer height corresponding to an estimated bead height for additively manufacturing the object, each of the plurality of adjacent layers corresponding to the continuous cross section perimeter and the segment intersecting the continuous cross section perimeter at the first intersection and the second intersection, wherein editing the 3-D digital representation of the object by inserting the gap between the segment and the continuous cross section perimeter at the first intersection includes inserting the gap between the segment and the continuous cross section perimeter at the first intersection of each of the plurality of adjacent layers.

In some embodiments, the method can include the 3-D digital representation of the object including a plurality of adjacent layers, layer height corresponding to an estimated bead height for additively manufacturing the object, each of the plurality of adjacent layers corresponding to the continuous cross section perimeter and the segment intersecting the continuous cross section perimeter at the first intersection and the second intersection, wherein editing the 3-D digital representation of the object includes inserting the gap between the segment and the continuous cross section perimeter by alternating between the first intersection and the second intersection such that the first intersection and the second intersection do not share the gap in adjacent layers.

In some embodiments, the method can include generating the plurality of toolpaths for additively manufacturing the object from the 3-D digital representation of the object with the gap includes zippering the plurality of toolpaths by moving the gap from the first intersection to the second intersection in adjacent layer toolpaths.

In some embodiments, generating includes generating the plurality of toolpaths for additively manufacturing the object from the 3-D digital representation of the object with the gap, such that at least one of the plurality of toolpaths is a continuous layer toolpath.

In some embodiments, slicing, with slicing software, includes slicing based exclusively on surface geometry of the 3-D digital representation of the object with the gap.

Some embodiments can include storing, in memory, the edited 3-D digital representation of the object with the gap between the segment and the continuous cross section perimeter.

In general, another innovative aspect of the subject matter described in this specification can be embodied in a method of generating a toolpath for additively manufacturing an object. The method includes generating a 3D digital representation of the object having a gap, wherein the 3-D representation of the object includes a continuous cross section perimeter and a segment intersecting the continuous cross section perimeter at a first and a second intersection, wherein the gap is positioned between the segment and the continuous cross section perimeter at the first intersection, slicing, with slicing software, the 3-D digital representation of the object with the gap, generating, with slicing software, a plurality of toolpaths for additively manufacturing the object from the 3-D digital representation of the object with the gap, such that at least one of the plurality of toolpaths has a reduced number of isolated paths relative to a plurality of toolpaths that would be generated by slicing software for additively manufacturing the object from the 3-D digital representation of the object without the gap.

The foregoing and other embodiments can each optionally include one or more of the following features, alone or in combination. In particular, one embodiment includes all the following features in combination.

In some embodiments, one of the plurality of toolpaths includes a continuous toolpath that includes a first section of the continuous toolpath extending from the second intersection to the gap along the segment, a second section of the continuous toolpath extending from the first section extending adjacent the gap, a third section of the continuous toolpath extending from the second section and extending adjacent to the first section along the segment from the gap to the second intersection, and a fourth section of the continuous toolpath extending from the third section along the entire continuous cross section perimeter from one side of the second intersection to the other side of the second intersection to complete the continuous layer toolpath at the first section of the continuous toolpath.

In some embodiments, the gap between the segment and the continuous cross section perimeter at the first intersection extends along the height of the 3-D representation.

In some embodiments, the 3-D digital representation of the object includes a plurality of adjacent layers, layer height corresponding to an estimated bead height for additively manufacturing the object, each of the plurality of adjacent layers corresponding to the continuous cross section perimeter and the segment intersecting the continuous cross section perimeter at the first intersection and the second intersection, wherein the gap between the segment and the continuous cross section perimeter alternates between the first intersection and the second intersection such that the first intersection and the second intersection do not share the gap in adjacent layers.

In some embodiments, the method includes generating the plurality of toolpaths for additively manufacturing the object from the 3-D digital representation of the object with the gap includes zippering the plurality of toolpaths by moving the gap from the first intersection to the second intersection in adjacent layer toolpaths.

In some embodiments, the method includes generating the plurality of toolpaths for additively manufacturing the object from the 3-D digital representation of the object with the gap, such that at least one of the plurality of toolpaths is a continuous layer toolpath.

In some embodiments, the method includes slicing based exclusively on surface geometry of the 3-D digital representation of the object with the gap.

In some embodiments, the method includes storing, in memory, the edited 3-D digital representation of the object with the gap between the segment and the continuous cross section perimeter.

In general, another innovative aspect of the subject matter described in this specification can be embodied in a method a method of generating a toolpath for additively manufacturing an object. The method including obtaining a 3-D digital representation of the object, slicing the 3-D digital representation of the object into a plurality of layers, one of the plurality of layers including a plurality of isolated contours including a perimeter contour and a plurality of inset contours surrounded by the perimeter contour, identifying a plurality of regions between the isolated contours including candidate bridge locations, generating a graph where nodes of the graph represent the plurality of isolated contours and edges of the graph represent the plurality of regions between the isolated contours, wherein a root node represents the perimeter contour and each of the nodes connect to at least one other node in a parent-child relationship or sibling-sibling relationship, wherein the edges of the graph are weighted, selecting a subset of the edges that connect all of the nodes without any cycles based on edge weight, beginning with the root node and based on the selected subset of edges, selecting a bridge location from the candidate bridge locations between the isolated contours for each of the selected subset of edges, and traversing the graph to generate a toolpath for 3D printing the object.

The foregoing and other embodiments can each optionally include one or more of the following features, alone or in combination. In particular, one embodiment includes all the following features in combination.

In some embodiments, the method includes excluding certain candidate bridge locations based on zippering criteria.

In some embodiments, the method includes prioritizing certain candidate bridge locations based on zippering criteria.

In some embodiments, the method includes the subset of the edges being selected based on a minimum spanning tree algorithm and wherein a depth first search algorithm is used to traverse the subset of the edges for selecting the bridge location for each of the selected subset of edges.

In general, another innovative aspect of the subject matter described in this specification can be embodied in a method of additive manufacturing. The method of additive manufacturing including defining a part using one or more 3-D computer aided design (CAD) programs as a model, introducing a gap between at least one intersection of two or more components of the part in the model, converting the model of the part to one or more STL files describing surface geometry of the part in a program language for fabrication by a 3-D printer, and generating a toolpath for the 3-D printer that allows the printer to print each layer of the part as a single continuous path.

The foregoing and other embodiments can each optionally include one or more of the following features, alone or in combination. In particular, one embodiment includes all the following features in combination.

In some embodiments, the gap between the at least one intersection of two or more components of the part in the model extends along the entire vertical height of the model.

In some embodiments, the gap between the at least one intersection of two or more components of the part in the model alternates positions between the at least one intersection of the two or more components of the part in the model and another intersection of the two or more components of the part in the model at different vertical heights of the model.

In some embodiments, the method includes zippering a plurality of layer toolpaths by introducing another gap at another intersection of two or more components of the part in the model such that the gaps alternate between adjacent layer toolpaths.

In some embodiments, the method includes changing the print bed by one bead height gradually as each layer prints.

In general, another innovative aspect of the subject matter described in this specification can be embodied in a method of creating additive manufacturing instructions for an object. The method including slicing, with a slicer, a model of the object into a plurality of slices for additively manufacturing the object, a slice including a plurality of contours each including a plurality of vertices and a plurality of edges, wherein the plurality of contours include an isolated perimeter path surrounding a plurality of isolated inset paths, identifying a plurality of candidate bridge locations between the plurality of contours, selecting a plurality of candidate bridge locations from the plurality of candidate bridge locations between the plurality of contours such that after forming bridges at the selected locations none of the plurality of contours will be isolated, forming bridges between the plurality of contours based on the selected plurality of candidate bridge locations such that none of the plurality of contours are isolated from each other, identifying a toolpath that includes a continuous sequence of traversal of the plurality of contours, and storing additive manufacturing instructions in memory based on the continuous sequence of traversal.

The foregoing and other embodiments can each optionally include one or more of the following features, alone or in combination. In particular, one embodiment includes all the following features in combination.

Some embodiments include forming bridges between the plurality of contours includes by inserting a first gap between a first contour to provide two disconnected vertices of the first contour, inserting a second gap between a second contour to provide two disconnected vertices of the second contour, connecting one of the disconnected vertices of the first contour with one of the disconnected vertices of the second contour, connecting the other disconnected vertex of the first contour with the other disconnected vertex of the second contour.

Some embodiments include counting a number of paths emanating from each vertex of the plurality of vertices of the plurality of contours and forming bridges such that the number of paths emanating from each vertex in the toolpath is an even number of paths.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 8A shows a perspective view of an exemplary 3D model of a structure having two cuts in accordance with one embodiment of the present disclosure.

FIG. 8B shows a top view of a slice of the exemplary 3D model of FIG. 8A.

FIG. 8C shows a representative toolpath generated from the FIG. 8B slice of the exemplary 3D model in accordance with one embodiment of the present disclosure.

DESCRIPTION OF THE CURRENT EMBODIMENTS

Figure 1:
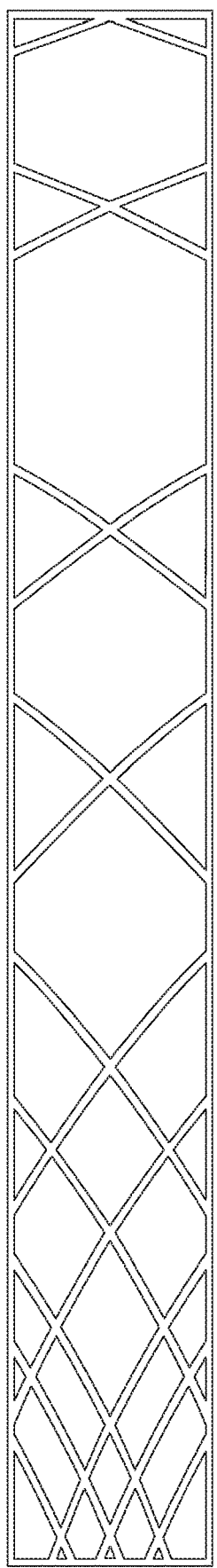
FIG. 1 shows a top view of an exemplary 3D model of a structure.

As discussed herein, the current embodiments relate to a system and method for improved additive manufacture of an object or part, as well as to the resultant additive structure. One aspect of the disclosure relates to selectively introducing gaps to intersections of a model of a part and generating an additive manufacturing toolpath for each layer of the part that is either continuous or at least has fewer isolated paths than a toolpath generated from a model without the gaps. Another aspect of the disclosure relates to selectively positioning the gaps in the model such that the gap positioning is different for different layers. In some embodiments the gaps alternate between different positions providing a zippering effect that strengthens the resultant additive structure while maintaining the ability to print the structure continuously, or at least with fewer isolated paths than without the gaps.

Some embodiments can provide improved additive manufacturing by introducing gaps into the model before slicing software creates the additive manufacturing instructions. For example, some embodiments generate instructions for additively manufacturing an additive structure based on a 3D model that has selectively introduced gaps at model intersections that force the slicing algorithm to create a continuous toolpath. In some embodiments, layer toolpaths generated by the slicing algorithm may not be continuous, but rather have fewer printing paths, fewer travel movements, lower travel distance, reduced layer time, or any combination thereof, in comparison to layer toolpaths to additively manufacture the model without the selectively added gaps. increasing the strength, aesthetics, or both, of the resultant additive structure.

Some embodiments of the present disclosure address the inability to use materials that ooze excessively as feedstock, such as polyethylene terephthalate glycol-modified ("PETG"), which is a clear amorphous thermoplastic filament. It can be difficult to successfully print with these, and other, types of materials with normal toolpaths produced by slicing programs. By eliminating stops and starts, such that the additive manufacturing can be done entirely through continuous printing, globing and inconsistent surface finishes can be reduced. Even where stops and starts are not entirely eliminated, and the printing cannot be done entirely continuously, a reduction of the number of stops and starts can make printing with these, and other, materials more practical.

One aspect of the present disclosure is directed to a system and method for introducing gaps into a 3D model for improving additive manufacturing of the 3D model. It bears a resemblance to spiralized printing because it involves printing using a continuous toolpath. However, both the exterior and interior of the model are built with one movement, not just the perimeter. The gap introduction system and method can reduce, or in some embodiments eliminate, intralayer empty travel and interlayer empty travel. This can result in reduced print times like those realized with spiralized printing without all of the limitations associated with spiralized printing, notably the restrictions to printing a one bead width perimeter. In addition, the gap introduction system and method can provide the ability to print multibead walled structures, increased structural integrity, adhesion between layers relative to spiralized printing, opportunities to print with materials unavailable when printing in spiralize mode, and other benefits. It is worth noting that while in conventional spiralized continuous toolpath printing, the print bed is changed by one bead height gradually as a single layer prints, they may or not be the case with the embodiments of the present disclosure.

Throughout the disclosure, reference is made to introducing gaps to a 3D model. The gap can be a hole, void, or essentially any other space that is inserted between two segments of the model. The gap can be introduced by removing a portion of one, or multiple, sections of the 3D model. Or, the gap can be created by introduced by moving the subject segments of the model apart. The size of the gap can vary from application to application. For example, the gap can be sized such that the slicing algorithm recognizes the space between two segments as non-traversable—this may be a different distance for different slicing software or a setting within the slicing software. Suffice it to say, the gap should have characteristics such that the slicing algorithm will no longer generate a toolpath across the gap.

Figure 16:
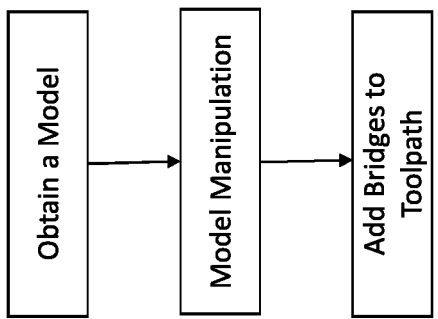
FIG. 16 illustrates a representative flowchart of some embodiments of a method of the present disclosure

As discussed in further detail herein, the current embodiments relate to a system and method for additive manufacture of an object with reduced total deposition time relative to a conventional process, as well as to the resultant additive structure itself. One embodiment includes adding bridges to the toolpath for an additive structure to provide a continuous toolpath for non-stop deposition during each layer of additive manufacture of the additive structure. Other embodiments include adding bridges to the toolpath for an additive structure to provide connection between isolated paths in each layer of the additive structure toolpath, including, in some embodiments to provide a partially, substantially, or fully connected path in each layer of the additive structure toolpath. Traversal of the toolpath with bridges can include reduced or minimized deposition time, for example by reducing or minimizing empty travel (i.e., start/stop movement of the additive manufacturing deposition equipment) during each layer of additive manufacture. More specifically, and with reference to FIG. 16, the method generally includes obtaining a model of an object (step 1), manipulating the model to introduce gaps at selected positions in the model (step 2), and generating a toolpath based on the manipulated model that has a continuous path or at least reduced isolated paths (step 3). The present disclosure describes a number of different embodiments of this method including modifying an existing model of an object or creating a model of an object by including gaps at selected positions in the model such that slicing software is forced to generate a continuous, or at least more desirable, toolpath. Other embodiments focus on adjustments to slicing software by manipulating the model of the object via the toolpath generation algorithm. The steps of FIG. 16 are discussed below in the context of various examples of some of the embodiments of the present disclosure.

Figure 17:
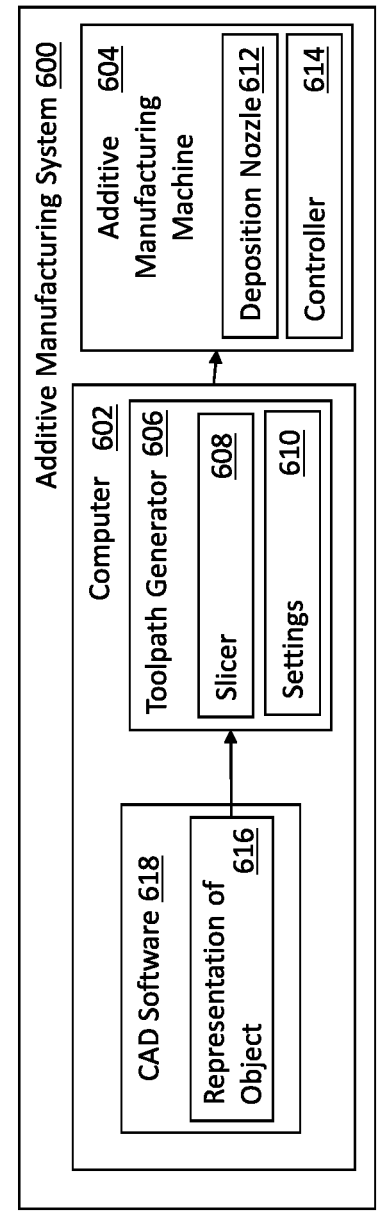
FIG. 17 illustrates a representative block diagram of some embodiments of a system of the present disclosure.

An additive manufacturing system 600 in accordance with one embodiment of the present invention is illustrated in FIG. 17. The additive manufacturing system 600 generally includes a computer 602 and an additive manufacturing machine 604. Computers and additive manufacturing machines are generally well known and therefore will not be described in detail. Suffice it to say, computer or processor 602 can essentially be any hardware or combination of hardware, local, remote, or distributed, capable of receiving a representation of an object, executing a slicing algorithm or other program on the representation, and outputting or communicating toolpath adjustments, improved toolpaths, additive manufacturing instructions, or any combination thereof. Further, the additive manufacturing machine 604 can be essentially any additive manufacturing equipment that can generate an additive structure according to additive manufacturing instructions. In operation, the computer 602 receives a representation of an object 616 that can be created or manipulated by CAD software 618. The received model can be one that was manipulated to have gaps at selected positions to force toolpath generation in accordance with some various embodiments of the present disclosure. The manipulation can include a model generated in accordance with an embodiment of the present disclosure or a model edited in accordance with an embodiment of the present disclosure. The toolpath generator 606 can slice the model 616 with a slicer. The toolpath generator can operate according to various configurable settings 610 including optimization settings that can be enabled or disabled. The toolpath generator generates toolpaths for each layer of the object, which can be provided in the form of additive manufacturing instructions to the additive manufacturing machine 604. The toolpath generator may or may not include sequencing information. The toolpath generator 606 can be a software program that executes on the computer 602. The toolpath generator 606 can include one or multiple software modules or can include one or more stand-alone software programs that can communicate with each other directly or indirectly, for example via files stored in memory on the computer. The controller 614 of the additive manufacturing machine 604 controls the deposition nozzle 612 according to the instructions to additively manufacture the object layer by layer. By virtue of the toolpath generation based on the introduction of gaps at selected positions in the model, the controller 614 controls the deposition nozzle along a continuous path for each layer without having to stop the nozzles movement or the stop the flow of material out of the nozzle.

The current embodiments of the system and method can provide a reduction in total deposition time by reducing empty travel time. Empty travel time can be reduced by forcing slicing software to create continuous toolpaths through the intelligent and selective introduction of gaps at strategic positions within the model. The continuous toolpath of each layer reduce the stops and starts of the deposition nozzle, reducing print time and improving print characteristics. In some embodiments, sufficient gaps are introduced such that the toolpath for each layer can be made continuous such that the nozzle can travel in a continuous path for the entire layer without having to stop deposition of material from the nozzle. Because the deposition nozzle does not need to be stopped mid-deposition of a layer as often, if at all, there is less or no opportunity for material at the end of a disconnected path to be dragged by the nozzle during empty travel. Further, the resultant additive structure can be cleaner because there is less or no opportunity for material to ooze from the nozzle during empty travel. It is worth noting that some embodiments of the present disclosure relate to modifications to the toolpath generator whereby bridges can strategically be created between isolated paths by introducing gaps in the isolated paths and connecting the isolated paths together. While bridging within the context of additive manufacturing sometimes refers to a horizontal overhang between two towers or vertical structures. For the avoidance of doubt, a bridge connection within the context of this disclosure generally refers to the planar connection between two isolated paths within a single layer without regard to the material in the layers above or below.

Forming an additive structure includes any process in which a three-dimensional build, part, object, or additive structure is formed in successive layers according to one or more additive manufacturing techniques. The system and method discussed herein is particularly suitable for Big Area Additive Manufacturing (BAAM), however its application is not limited to BAAM, but rather it is applicable to essentially any additive manufacturing systems involving a discrete toolpath instead of creating entire layers at once. For example, suitable additive manufacturing techniques for use in conjunction with embodiments of the present invention include, by non-limiting example, direct energy deposition (DED), fused deposition modeling (FDM), welding-based systems, and essentially any other deposition-based additive manufacturing process. The additive structure may be formed according to other processes, whether now known or hereinafter developed. These and other additive manufacturing processes are used to form the additive structure, which can comprise essentially any three-dimensional geometry, including geometries having overhangs, undercuts, and internal volumes.

The additive structure can be formed with essentially any material or combination of materials used in additive manufacturing. This can include additive manufacturing materials now known or hereinafter developed. The current embodiments are particularly suitable for any additive process that works by deposition including deposition of metal (both powder and wire), thermoplastics, thermosets, composites, and other materials. Examples of deposition materials can include, but are not limited to, PETG, rubber, silicone, carbon fiber, and glass fiber.

One embodiment in accordance with a system and method of the present disclosure will now be described in detail. The system and method is generally directed to modifying a representation of a part, such as a 3D, CAD model, or STL model, and configuring a slicing engine to allow for a part to be printed without starting and stopping the extruder. By selectively introducing gaps into a model, slicing software can be forced to generate a continuous toolpath for each layer, or at least a toolpath with fewer isolated paths. Put differently, the resultant toolpath can be traversed non-stop without starting and stopping the printing, or at least with a reduced amount of starting and stopping.

Traditional spiralized printing while providing some advantages, has a number of limitations that make it impractical for most 3D printing applications. Perhaps most notably, intersections in the part's design or 3D model are a significant impediment to spiralized printing. Intersections, that is places in a part where multiple walls or segments meet, converge, come together, or cross, are an issue because slicing algorithms generate toolpaths with distinct and isolated polygons, which are normally printed using insets. However, because spiralized printing treats the entire part (inner and outer geometries) as perimeters in order to create a single continuous bead path, these isolated toolpaths and intersections cannot be successfully print with traditional spiralizing techniques.

In some embodiments of the present disclosure, the 3D model of the part can be modified to improve additive manufacturing toolpaths. For example, the 3D model of a part can be designed (or have its design modified) such that walls do not touch. That is, certain intersections of a model can be modified (or designed) such that there is no intersection, improving the toolpath(s) ultimately generate. Alternatively, instead of modifying or designing a 3D model without certain intersections, the slicing software can be adapted to detect intersections and selectively break them up as part of the slicing algorithm to generate the toolpath(s). To eliminate or reduce the number of intersections, the resultant toolpath(s) can be configured such that the extruded beads printed with the toolpath(s) come close together without touching, while leaving sufficient room for the printer to return and extrude next to itself.

It should be noted that some embodiments of the present disclosure can include changing the print bed by one bead height gradually as a single layer prints in order to provide a single continuous toolpath. Other embodiments of the present disclosure can print on a layer by layer basis, where the print head is stopped and restarted between layers or where the print head moves to the next layer (e.g. by the print bed changing height or the print head changing height) without turning off. Some embodiments may include adjusting parameters or print characteristics during a transition period to better facilitate the 3D printing process. For example, the extrusion rate can be slowed before, during, or after a layer transition, or any combination thereof. As another example, the move speed of the print head can be changed before, during, or after a layer transition, or any combination thereof. In some embodiments a combination of both extrusion rate and print head move speed may be adjusted to accommodate a suitable transition between layers of a 3D printing process.

One embodiment of a continuous toolpath printing method of the present disclosure will now be discussed in connection with FIGS. 1-5. In particular, an example of a resultant additive structure manufactured with an embodiment of a method of additive manufacturing a 3D model using selective gaps is illustrated in FIG. 5. The exemplary structure depicted in FIG. 5 is a pillar 30 fabricated from white PETG that has a relatively complex inner geometry but does not include start and stop seams typically seen in 3D printed parts. The pillar inner geometry includes former intersections, which appear as peaks 34. These peaks may or may not touch. The gap introduced during CAD modeling from which the toolpath is generated has a gap, such that when printed the 3D printer prints the structure with the peaks. Depending on the various characteristics of the printing and slicing software, the resultant structure when printed may or may not have peaks that touch. In the depicted embodiment, the peaks come close, but do not touch. Other intersections 32 are formed using side-by-side bead extrusions. In total, due to the gaps between the former intersections, the entire additive structure 30 was able to be printed continuously, layer by layer, without stopping and restarting the extrusion process. By selectively introducing gaps in the 3D model (or introducing gaps during the slicing algorithm), the slicing algorithm creates a continuous toolpath with side-by-side walls.

Figure 2:
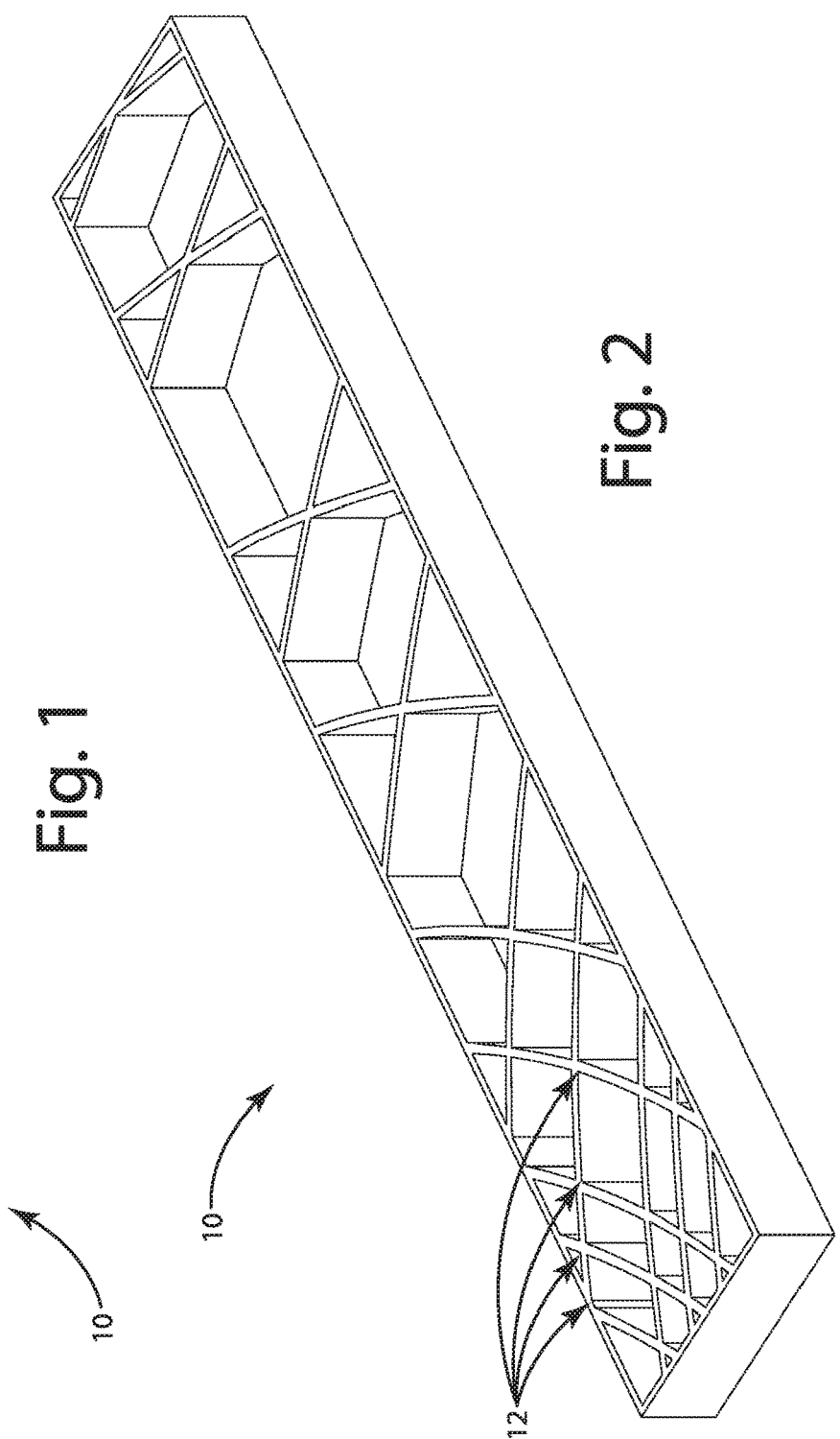
FIG. 2 shows a bottom perspective view of the exemplary 3D model of FIG. 1.

FIG. 1 illustrates a top view of a 3D model 10 of the pillar 30 of FIG. 5 and FIG. 2 illustrates a perspective bottom view of the 3D model. The model includes a number of different intersections 12 both within the internal geometry as well as along the perimeter of the model. Traditional spiralizing of this model would be impractical—producing a simple rectangle without any internal geometry and just a single bead width along the perimeter. Such an additive structure created by traditional spiralizing would serve almost no practical purpose due to its low structural integrity making it fragile or deformable.

Figure 3:
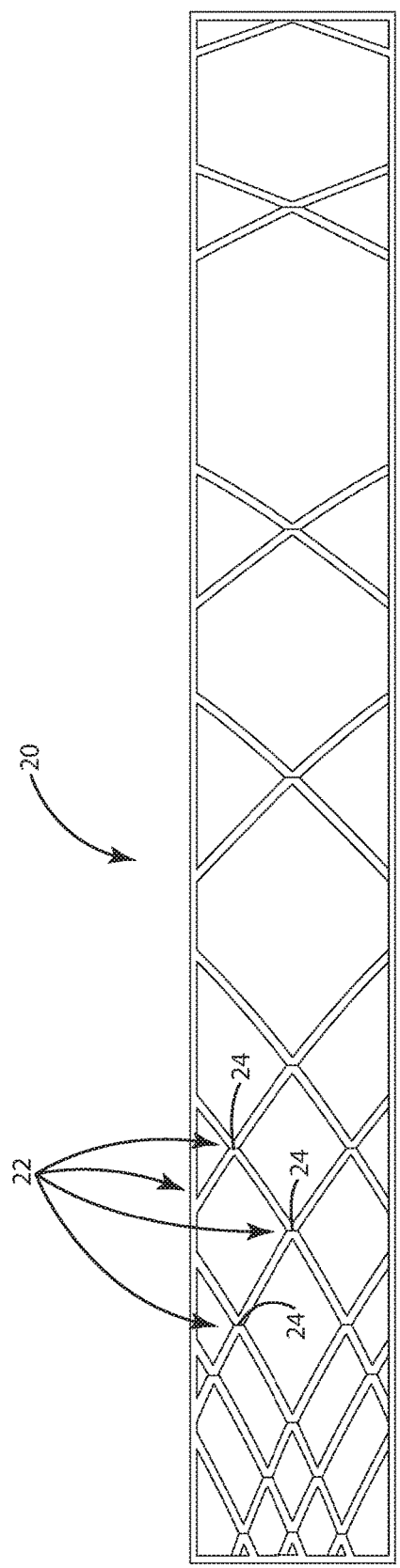
FIG. 3 shows a top view of the exemplary 3D model of FIG. 1 with voids integrated into the model for additive manufacture according to one embodiment of the present disclosure.
Figure 4:
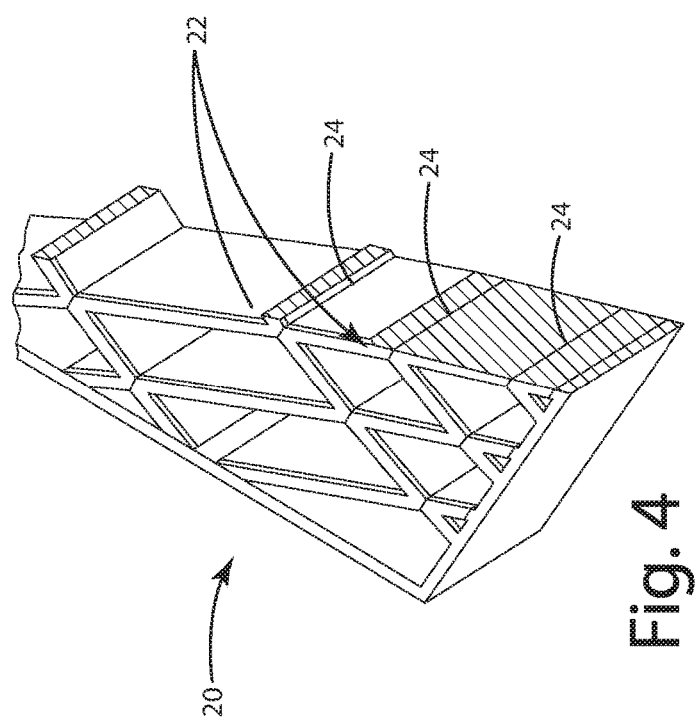
FIG. 4 shows a bottom partial perspective sectional view of the exemplary 3D model of FIG. 3 depicting the voids.
Figure 5:
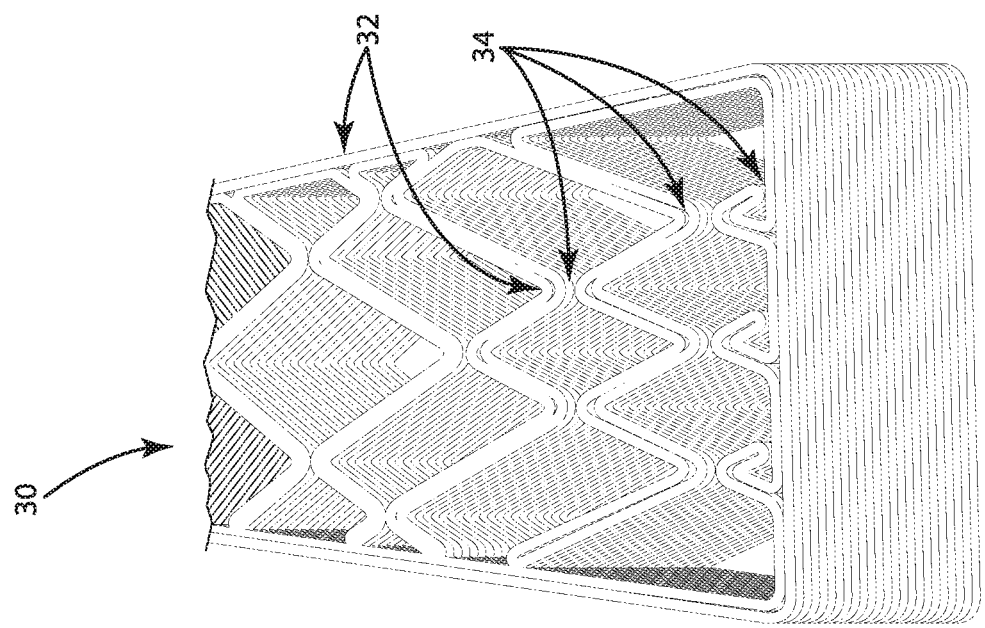
FIG. 5 shows a partial bottom perspective view of an exemplary resultant additive structure printed based on the exemplary 3D model of FIGS. 3-4, according to one embodiment of the present disclosure.

FIGS. 3-4 illustrate an embodiment of an improved additive manufacturing process of the present disclosure where the 3D model 20 of the pillar can have gaps inserted that improve the toolpath generation. Specifically, gaps 24 can be selectively inserted at various intersections 22 to ensure that the toolpath generated from the slicing algorithm will be continuous within each layer. The partial bottom sectional view of FIG. 4 shows how in the depicted embodiment each gap is created by a virtual cut through the entire vertical of the model. It should be noted that although the gaps introduced are vertical, in other embodiments, the gaps can be introduced by cutting through the 3D model at an angle. Depending on how the slicing algorithm cuts the model, each layer will have gaps and toolpath generation across the gap will be prevented.

The process for determining where to include gaps in the various embodiments of the present disclosure can vary from application to application. In the depicted embodiment, gaps are included at most intersections throughout the model, with the exception of certain intersections, which is apparent in FIG. 3 and FIG. 5. Gaps or cuts can be inserted or included based on a variety of different factors. In some embodiments, gaps between particular intersections are selectively included according to a process for ensuring a continuous or Euler path can be defined in the resulting toolpath. Such a continuous toolpath can be ensured by considering the model in terms of edges/segments and vertices and ensuring that each vertex has an even number segments extending from it. The vertices and edges resulting from slicing a model can be manipulated by inserting gaps at different locations in the model. In addition, the number of vertices and edges can also be manipulated by changing characteristics of the 3D printing, such as the bead width. By lowering the bead width such that two beads can be laid adjacent to one another, an intersection where three walls intersect can be converted into a pair of vertices, each with two edges that can be traversed in a Eulerian or Eulerian-like fashion. This is illustrated, for example, in FIG. 5, at many of the various intersections of the pillar. The conversion from three walls intersecting to two vertices, each with two associated edges extending therewith is merely exemplary. In other embodiments, 5, 6, 7, 8, 9-way or other numbers of walls intersecting can be converted into different numbers of edges and vertices.

In the depicted embodiment, the resultant toolpath is produced by setting the bead width for the slicing algorithm (e.g., based on the specific additive manufacturing equipment) to be a multiple of the width of the smallest width of any segment of the model. In alternative embodiments, the bead width can be set in a different manner such that an appropriate tool path can be generated. In the depicted embodiment, the width of each segment is generally the same and the bead width is set such that two beads, side-by-side produce the width of the segment. In alternative embodiments, the printer may include settings for changing the bead width that can accounted for by the slicing algorithm such that the resultant toolpath produces two or more side-by-side beads. Perhaps as most easily seen in the resultant additive structure of FIG. 5, by printing two beads side-by-side, the various segments of a layer can be traversed to where an intersection would have been and then the print path can double back adjacent to itself before reaching the intersection. By selectively introducing gaps into the model and generating the model segments with at least two beads of material, each toolpath layer can be generated to be continuous—including both perimeter and inner geometry, as depicted in FIG. 5.

The FIG. 5 pillar embodiment illustrates an example where two bead widths produce an appropriate segment width for the various segments of the model. It should be understood that the segment widths need not match precisely to the model and that the bead widths may be configured to be within a particular margin of error. Further, the same process is applicable for situations where 3, 4, 5, or more bead widths side-by-side form the appropriate segment width. In addition, although the FIG. 5 model has segments that have generally the same width, it should be understood that variations in segment width can be handled by including additional side-by-side beads or changing print characteristics, such as print speed or extrusion rate. The embodiments of the present disclosure need not all have segments of the same width.

Another embodiment will now be described in detail in connection with FIGS. 11-15 and the 3D printing of a boat hull truss. In this embodiment, the 3D model 500, depicted in FIG. 11, was designed with gaps 502 to facilitate generation of continuous layer toolpaths. While gaps can be introduced to an existing model in other embodiments, in this embodiment the model was designed at the outset with the selected gaps such that when sliced by a slicing algorithm for 3D printing it will be printed according to a toolpath with a single continuous path. By inserting small cuts 502 along wall sections 504 to break up closed loop paths that otherwise would be formed during slicing, the extruder is forced to double back on itself instead of creating an isolated path. These cuts 502 can be small, for example in some embodiments just 0.02 inches wide, or about $\frac{1}{15}^{th}$ the size of the nozzle diameter in one exemplary embodiment. A cut this small prevents the segments 504 in the structure from being connected in the tool pathing at the location of the gap, when optimization is disabled. The intelligent and selective placement of the gaps allows for generation of a continuous toolpath for the entire layer in this embodiment. More specifically, the toolpath generated forces the extruder to double back on itself and create one large closed loop for a layer (see FIG. 13) instead of individual isolated paths it would typically do without the gaps (see FIG. 12). Further, because the of the bead width and how close the toolpath segments near the gap run, the resultant additive structure still bonds across the gap in the actual print (see FIG. 15).

Referring to slicer optimization, typically slicer software includes optimization processes that aim to increase speed of printing and eliminate printer moves. For example, one optimization process includes eliminating any and all paths of a length smaller than the nozzle diameter. Similarly, optimization generally includes eliminating any holes that are smaller than the nozzle diameter. Traditional wisdom is that these optimizations add more time to the print than they remove. However, the optimization framework does not consider that the gaps allow for a continuous toolpath, for example due to the gaps allowing formation of a Euler path or Euler-like path where the entire network can be traversed without traversing an edge multiple times.

The removal of such holes by traditional slicer optimization processes would result in any gaps introduced to the model or STL file, such as those to force creation of a single continuous path (or reduce path length) to be ignored. Most slicer algorithms have such optimizations turned on by default. If gaps are introduced but such optimization processes are left in place, the small cuts will be ignored and the toolpath generated will look similar or identical to the toolpath generated were the gaps not introduced at all (See FIG. 12). Accordingly, to the extent any of the embodiments of the present disclosure are used in connection with slicer software—such optimization settings can be disabled as part of the additive manufacturing process. In one embodiment, slicer software may be modified to include a setting that allows users to skip optimization during inset generation or at least avoid the portion of optimization that would discount the gaps enabling continuous pathing.

Figure 12:
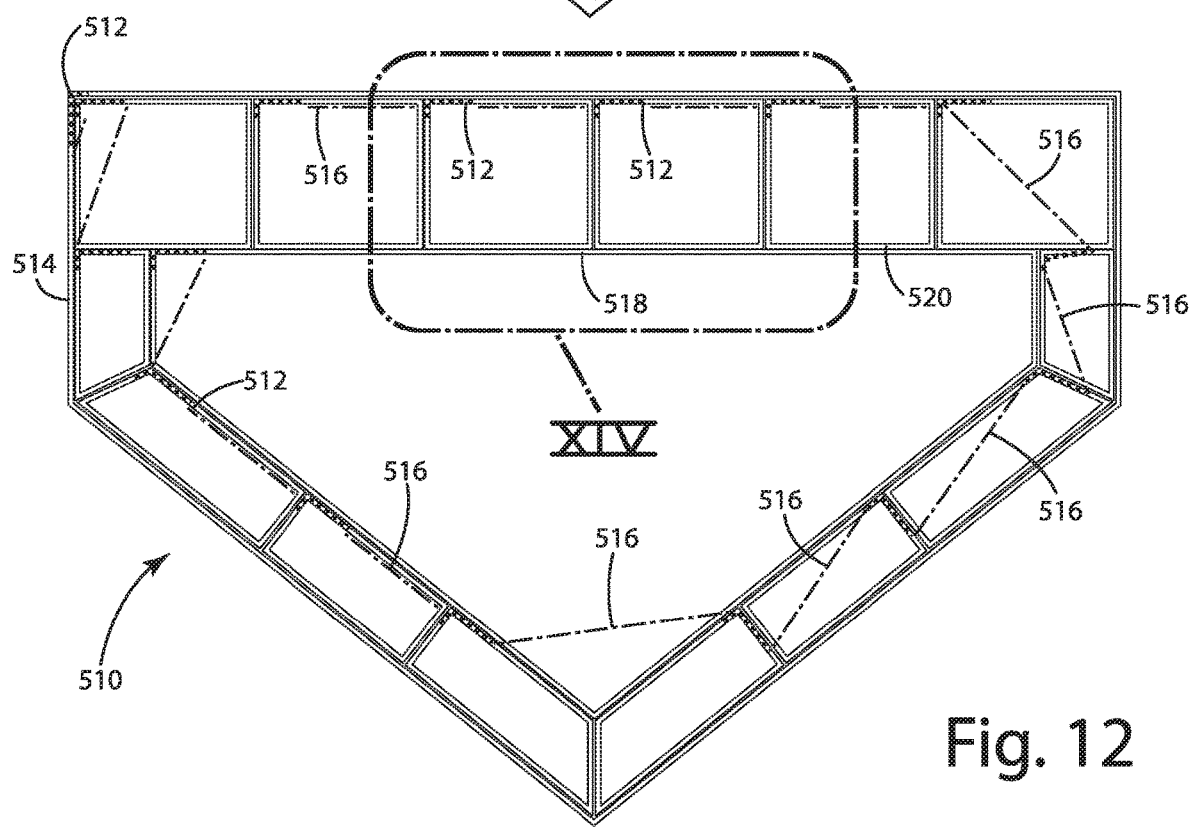
FIG. 12 shows a corresponding toolpath of the FIG. 11 model generated by traditional slicing software with optimization activated.
Figure 14:
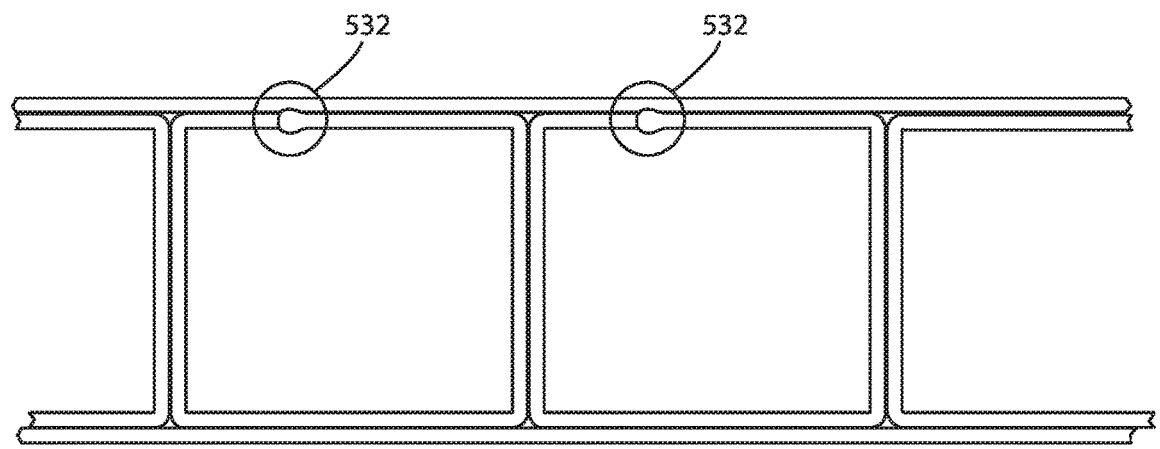
FIG. 14 illustrates a bottom view of a resultant exemplary additive structure 3D printed according to the toolpath of FIG. 12 along with a close-up portion depicting where the blemishes from stops and starts of the 3D printer occur.

Comparing the approaches of traditional printing and continuous printing can be done within the context of a variety of different parts or objects. For example, the boat hull model of FIG. 11 was printed with traditional 3D printing methodologies and also with an embodiment of the continuous printing methodology of the present disclosure. Specifically, both print jobs were performed on a Cincinnati Big Area Additive Manufacturing ("BAAM") system where the object was 60 inches long and 42 inches wide. The hulls were both made using a 0.3 inch nozzle and a 3 inch long tip wipe. The traditional slicing algorithm with optimizations enabled generated a toolpath 510 as shown in FIG. 12 included numerous starts and stops 512 to create multiple isolated paths (a perimeter path 514, an innermost isolated path 518, and 14 additional isolated paths 520. empty travel 516 to move the print head from one stopping location to another starting location are included in the toolpath 510 shown in FIG. 12 as well. Some of the empty travel 516 overlaps the print toolpath and some of it does not. That is, in the illustrated example, the print head moves over some areas twice, once while printing and once while empty traveling to the next start/stop location. The overlapping portions of empty travel 516 are shown adjacent to the isolated paths 520 so as not to create confusion. The resultant additive structure 530 from printing this toolpath 510 is illustrated in FIG. 14. Of particular note are the blemishes in the structure where the starts and stops have created rough seams 532. These blemishes represent aesthetic and structural integrity issues.

Figure 13:
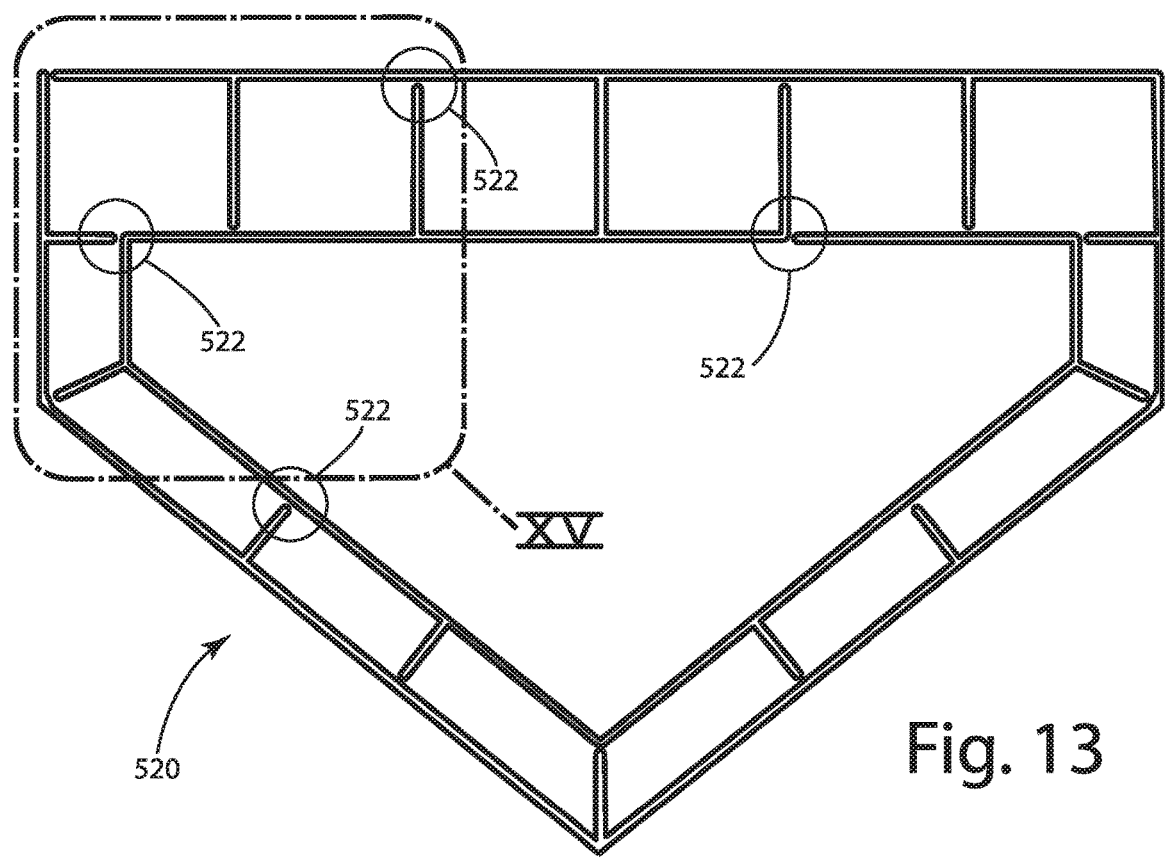
FIG. 13 shows a corresponding toolpath of the FIG. 11 model generated by slicing software in accordance with an embodiment of the present disclosure—without toolpath optimization.
Figure 15:
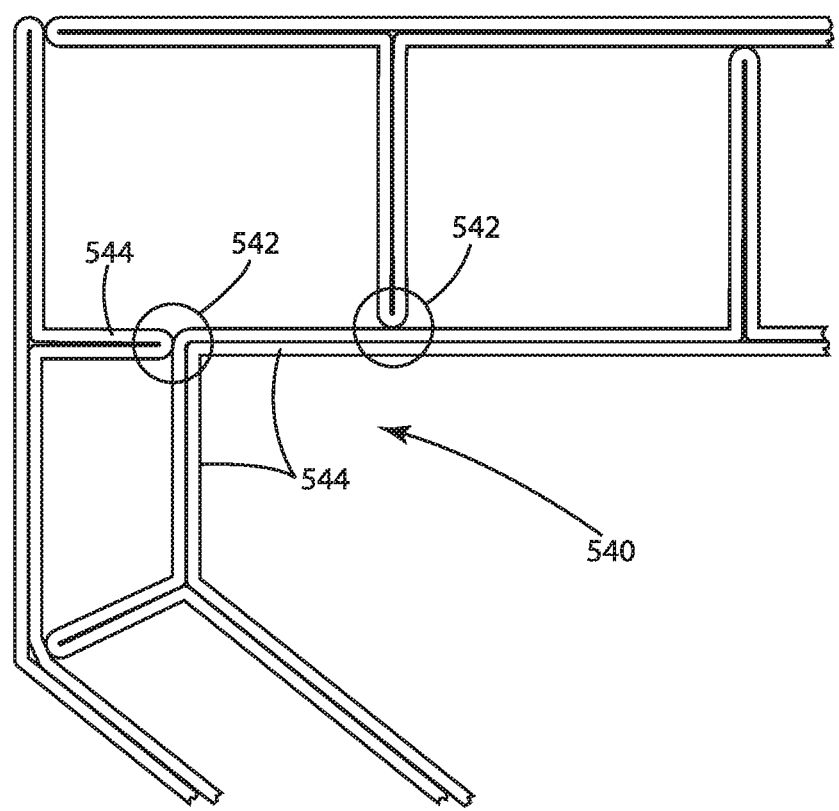
FIG. 15 illustrates a top view of a resultant exemplary additive structure 3D printed according to the continuous toolpath of FIG. 13 with a close-up portion depicting the gaps and lack of blemishes because of the lack of stops and starts of the 3D printer.

In contrast, FIG. 13 illustrates a representative toolpath 520 generated by one embodiment of the present disclosure. The entire layer toolpath 520 is continuous because it does not require the printer to stop and restart—the entire path can be traversed by the print head continuously. The toolpath accomplishes this single path print by allowing the extruder to essentially double back on itself (e.g., adjacent to itself) and does not utilize isolated paths due to the selective placement of gaps 522 at certain intersections between different wall segments. The gaps in the 3D model/STL file/toolpath in this embodiment can be about 0.02 inches wide, but the beads resultant from the printing can have a small amount of overlap that prevents an actual gap form forming during printing, as illustrated in FIG. 15 and emphasized with reference to callout area 542. FIG. 15 depicts a partial view of one exemplary resultant additive structure 540 printed using the toolpath 520 of FIG. 13. This view illustrates the lack of blemishes (e.g., rough seams) in the various segments 544 of the truss structure when compared with the close-up view of the truss structure of FIG. 14.

In addition to the improved structure due to continuous printing, there can be a significant time saving associated with printing continuously. Below, Table 1 shows a comparison of the two prints. The travel distance for the traditional pathing refers to the XY distance between the start and stop of each move including the transition to the next layer. In this embodiment, the single path 520 only has one travel move, from the end of the tip wipe in a path to the start point of the next layer.

|  | Traditional Pathing | Single Path |
|---|---|---|
| Number of Printing Paths | 16 | 1 |
| Number of Travel Moves | 16 | 1 |
| Travel Distance (in) | 158.88 | 3 |
| Layer Time (s) | 129.36 | 109.57 |

The single path 520 approach, in this exemplary embodiment, saved more than 15% (about 19.8 seconds per layer) of the time the traditional pathing 510 took. While the time savings is geometry dependent, in general objects with many individual short paths will see a large time savings while parts with fewer paths will see less saving.

Techniques for generating toolpaths are generally well-known. For avoidance of doubt, skilled artisans will recognize that a toolpath can include a series of layer toolpaths that together form additive manufacture instructions for an object, such as a G-Code file. One of the first steps to obtain a toolpath for 3D printing an object is to obtain a model or representation of the object to be 3D printed, for example by obtaining or generating a computer aided design ("CAD") file. A CAD file can be generated with CAD software, such as Solidworks, Fusion 360, or Rhino, to name a few well-known CAD software platforms. CAD software provides many tools that allow for creation of models of complex structures as well as assemblies of multiple parts. A raw CAD file can store all the original data from the object design including, for example, curvatures such as arcs and splines. The CAD file can be manipulated with various CAD software. For example, the gaps discussed herein can be introduced using various tools available in different CAD software. In order to prepare the CAD file for additive manufacture of the object, typically the CAD file is converted or exported into a stereolithography (STL) file. An STL file typically uses triangles to approximate the surfaces of the CAD file.

The model is then provided to a toolpath generator software package, sometimes referred to as a slicer that converts the model or representation of an object can be converted into additive manufacturing instructions, such as G-Code. A slicing program (or toolpath generator) is a program that divides an STL file (or other representation of the object) into layers, known as slices, and then creates toolpaths for each layer, which are stored as G-Code (or another form of additive manufacturing instruction). G-Code is one form of output of slicing software that can be loaded into a 3D printer to instruct it how to build an object. Slicing is well known and therefore will not be discussed in detail. Suffice it to say, slicing typically involves intersecting a horizontal plane with a representation of an object, such as is stored in an STL file, and continuously moving the plane vertically by a single layer height until the entire part has been sliced. Each time the plane meets the edge of a triangle in the STL file, a point or vertex is created. All the vertices together form a polygon, or polygons, that act as the boundary, or boundaries, for that layer. From there, the slicer fits toolpaths to each polygon to form the layer. The size of the toolpaths and how they are generated can be determined based on various settings.

It is worth noting that a toolpath typically includes position information, but may or may not include sequencing information. For example, a toolpath can refer to the location and sequence of deposition, or to just the location of deposition. Further, a toolpath can be described as a graph, referencing the term from the mathematical area of graph theory. A graph is generally represented by vertices or nodes and line segments or edges between those vertices. Graph theory terminology can be helpful in describing, defining, or obtaining a toolpath. For example, a toolpath may be represented by a graph and the sequence of the toolpath can be represented by the sequence of visits of the vertices and/or edges. Where a toolpath does not have any isolated paths, it can be described as closed, fully connected, or contiguous, referencing similar terminology from graph theory, such as the toolpaths depicted in FIG. 13 as well as FIGS. 9C and 9E. Graph theory can be helpful in describing toolpaths because there are graph theory terms that describe particular types of paths. For example, a Eulerian path refers to a path that visits every edge exactly once, allowing for revisiting vertices.

Typically, perimeter moves are the first to be generated during the slicing process, and they are created by offsetting the boundary polygon inward by one bead width. Following the perimeters are the insets, which can also be created by offsetting the original polygon, minus the perimeter region, inward by one bead width. After all perimeters and insets are generated, the remaining area, which sometimes includes multiple regions, is designated as infill. The infill region can be filled using a variety of methods, including embodiments of the system and method of the present disclosure described herein. It is worth noting that although some of the current embodiments of the present disclosure are suitable for generating perimeter and inset toolpaths, other embodiments of the present disclosure are equally suitable to generate infill toolpaths or an entire layer toolpath including perimeter, inset, and infill pathing. The embodiments of the present disclosure provide a system and method for traversing a path with additive manufacturing equipment that reduces, or minimizes, starts/stops of printer equipment. Accordingly, many embodiments are suitable for essentially any path type as long as gaps are selectively included in the representation of the object (e.g., CAD model) or the model is modified to introduce an appropriate set of gaps.

Infill can be slicer-defined or CAD-defined. Infill generally refers to material that fills or is used to fill a space or hole. Slicer-defined infill is infill that is not defined by the CAD file's internal structure, but instead by slicer set parameters in combination with the CAD defined perimeter. CAD-defined infill is essentially a stand-alone internal structure that is used as infill or internal structure for another structure. Oftentimes, but not always, CAD-defined infill has a lattice structure. CAD-defined infill doesn't make use of slicer infill definition because the perimeter and insets themselves define the internal, typically lattice, structure. Because sliced lattice structures typically generate quite a few perimeter and inset isolated paths, CAD-defined infill typically is particularly suitable for use with the gap introduction of the various embodiments of the present disclosure.

Slicer-defined infill structures do not exist in the original CAD file or in the STL file because they are defined and generated by the slicer. Slicer-defined lattice infill can be generated according to the same methodology described in connection with FIG. 10.

Figure 6B:
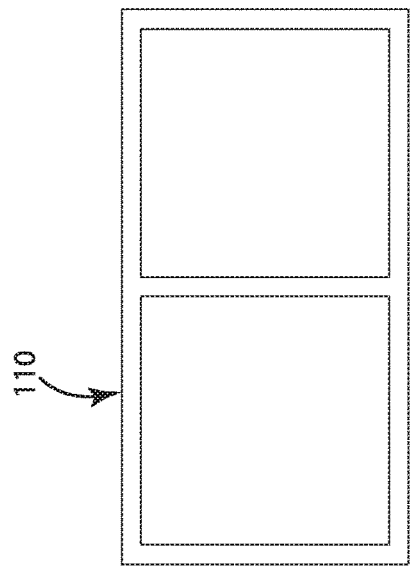
FIG. 6B shows a top view of a slice of the exemplary 3D model of FIG. 6A.
Figure 6C:
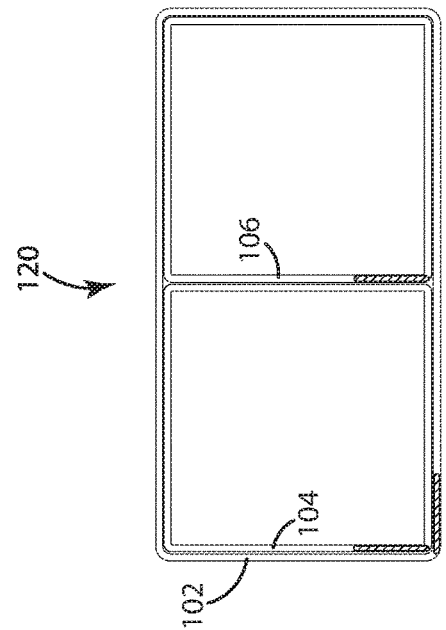
FIG. 6C shows representative toolpaths generated from the FIG. 6B slice of the exemplary 3D model.
Figure 6A:
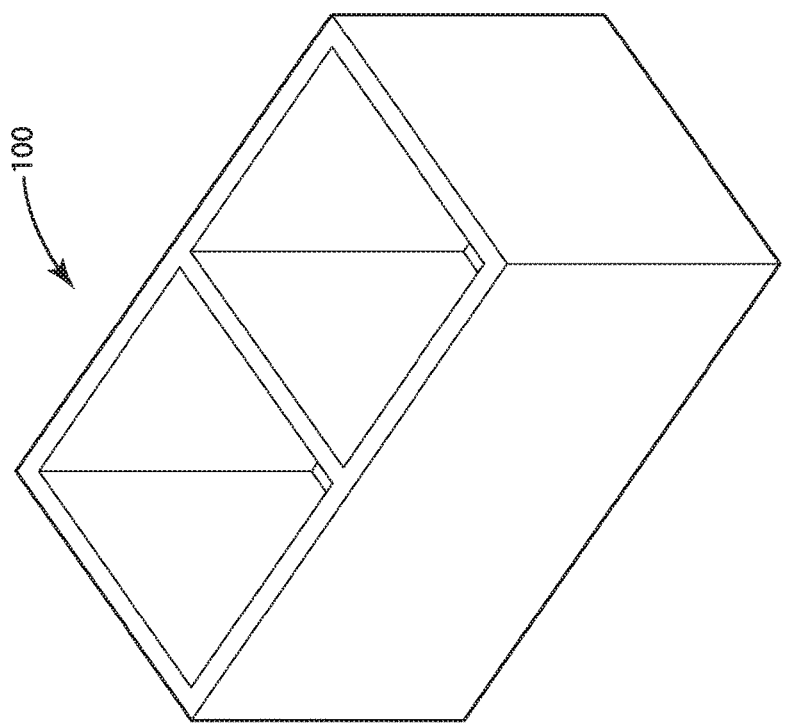
FIG. 6A shows a perspective view of an exemplary 3D model of a structure.

Additional examples will now be described in more detail contrasting the systems and methods of embodiments of the present disclosure with the slicing and toolpath generation of a simpler geometry to aid in the full description and understanding of various embodiments of the present disclosure. As discussed in the background section, FIGS. 6A-C illustrates a simple 3D model geometry in the form of a three dimensional figure eight 100 (FIG. 6A), a representative slice of the model 110 (FIG. 6B), and a corresponding toolpath 120 generated by a traditional slicing algorithm (FIG. 6C). The traditional toolpath includes three paths: a rectangular perimeter or bounding path 102, and two inset square paths 104, 106 offset from the bounding rectangle. The starts and stops of the printer illustrate that the layer toolpath in total has three separate paths with three stops.

The following embodiments focus on reducing the number of isolated paths and in some cases creating a continuous toolpath for each layer. These embodiments generally include transforming discretized layers of a model into a complex polygon rather than multiple polygons per layer. Or, in some cases, transforming portions of a discretized layers of a model into a complex polygon to reduce the number of isolated toolpaths per layer.

Figure 7B:
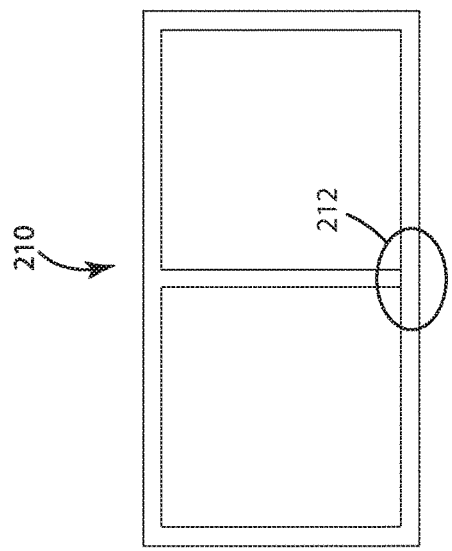
FIG. 7B shows a top view of a slice of the exemplary 3D model of FIG. 7A.
Figure 7C:
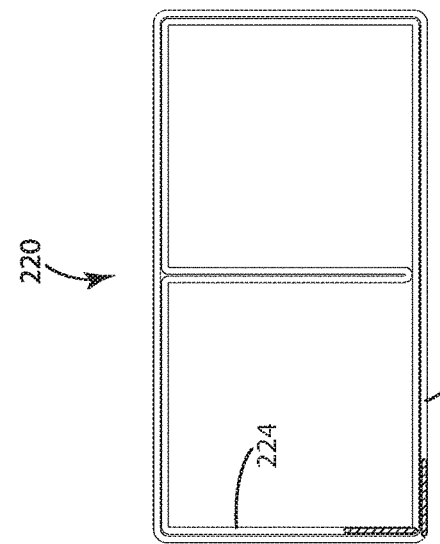
FIG. 7C shows a representative toolpaths generated from the FIG. 7B slice of the exemplary 3D model in accordance with one embodiment of the present disclosure.
Figure 7A:
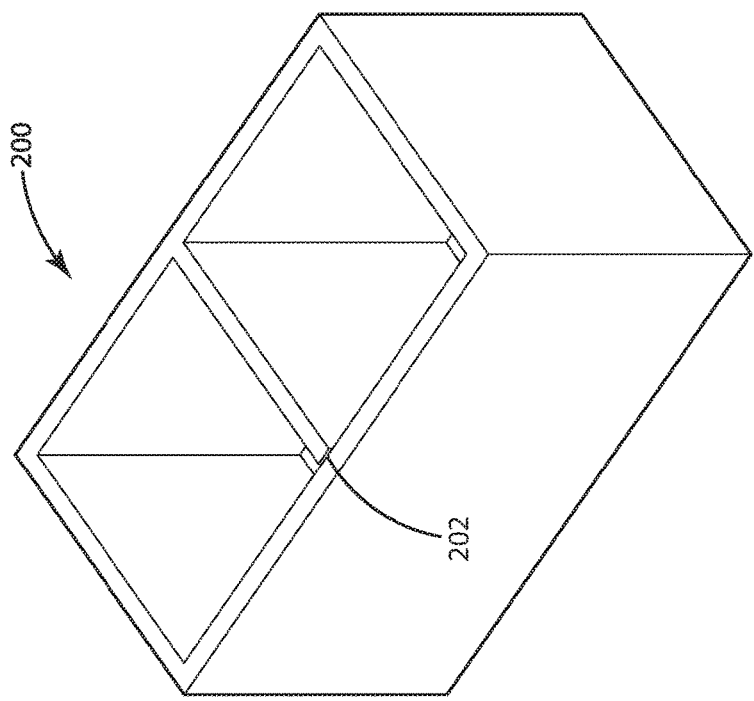
FIG. 7A shows a perspective view of an exemplary 3D model of a structure having a single cut in accordance with one embodiment of the present disclosure.

FIGS. 7A-C illustrate a three-dimensional model of a figure eight geometry with a gap 200 (FIG. 7A), a representative slice of the model 210 (FIG. 7B), and a corresponding toolpath 220 generated by an embodiment of the present disclosure (FIG. 7C). As shown in FIGS. 7A and 7B, the model includes a vertical gap 202 at the intersection 212. This single cut reduces the number of toolpaths from three to two, illustrated by the resultant toolpath 220 having an isolated perimeter toolpath 222 for printing the outer geometry and an isolated interior toolpath 224 for printing the internal geometry. Because there are only two paths in the toolpath 220, there are only two stops instead of three, resulting in a time savings in printing due to less empty travel.

FIGS. 8A-C illustrate a three-dimensional model of a figure eight geometry with two gaps 300 (FIG. 8A), a representative slice of the model 310 (FIG. 8B), and a corresponding toolpath 320 generated by an embodiment of the present disclosure (FIG. 8C). As shown in FIGS. 8A and 8B, the model includes a first vertical gap 302 at a first intersection 312 and a second vertical gap 304 at a second intersection 314. The addition of a second cut reduces the number of toolpaths to one 322, meaning just one start and stop.

The previous two examples utilize gaps that extend the entire height of the model. In some embodiments, gaps that extend a partial height of the model can be utilized to create a zippering effect. The zippering aspect involves systematically shifting the position of the gaps on a layer by layer basis. That is, zippering can still reduce or eliminate the number of isolated paths created during toolpath generation, for example by transforming discretized layers (or portions thereof) of a model into a complex polygon rather than multiple polygons per layer by introducing gaps between selected intersections. However, instead of the gaps running the height of the model, the gaps can change position layer to layer. The strategically placed gaps in the design force the slicing software to generate a continuous toolpath for each layer since it is a single complex polygon, however, because the gaps are in different positions in different layers, the continuous toolpath generated for an adjacent layer will not have a gap at the same position as an adjacent layer. This zippering effect can assist with providing stronger bonds between layers throughout the part and also change the aesthetics of the transitions between layers. Although the depicted embodiment shows two different gaps alternating between two different positions with each adjacent layer, other embodiments can be configured in a different manner. For example, additional gaps can alternate between two different positions layer to layer, the position of the gaps can alternate between additional positions, such as 3, 4, or more different positions, or the depth of the gaps can vary across the height of the part. For example, two slices may have a gap at one position, then two slices may have a gap at another position. Further, the gap heights can be variable. The configuration of the various characteristics of the gaps can be selected based on the application, for example to provide a particular aesthetic appeal, a particular set of structural characteristics, or a combination thereof.

Figure 9A:
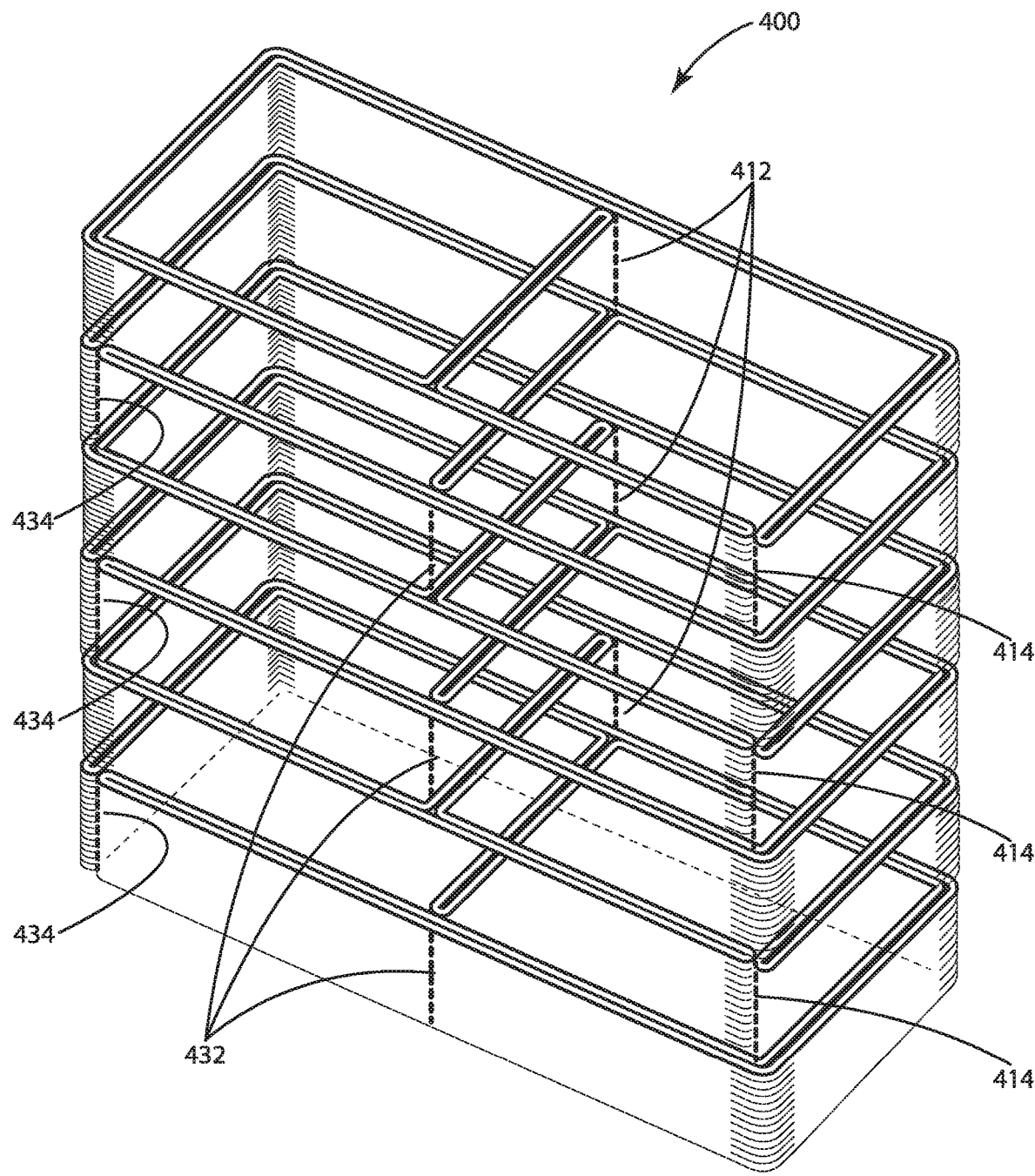
FIG. 9A shows a representative exploded view of the overall toolpath of an exemplary 3D model of a structure having zippered cuts in accordance with one embodiment of the present disclosure.
Figure 9B:
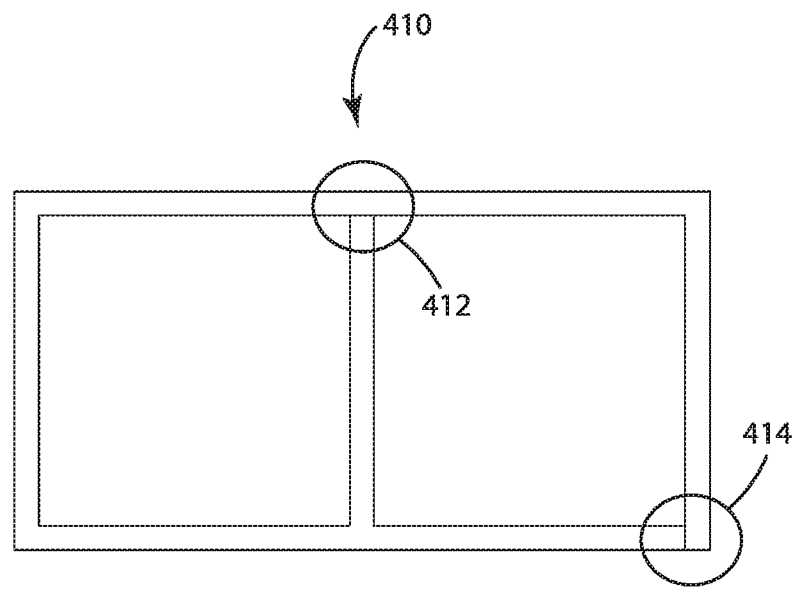
FIG. 9B shows a top view of a slice of the exemplary 3D model illustrating one toolpath of FIG. 9A.
Figure 9C:
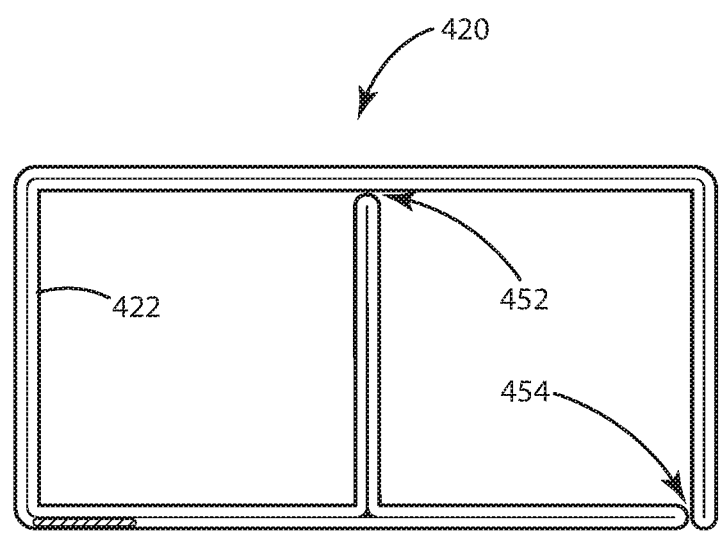
FIG. 9C shows a representative toolpath generated from the FIG. 9B slice of the exemplary 3D model in accordance with one embodiment of the present disclosure.
Figure 9D:
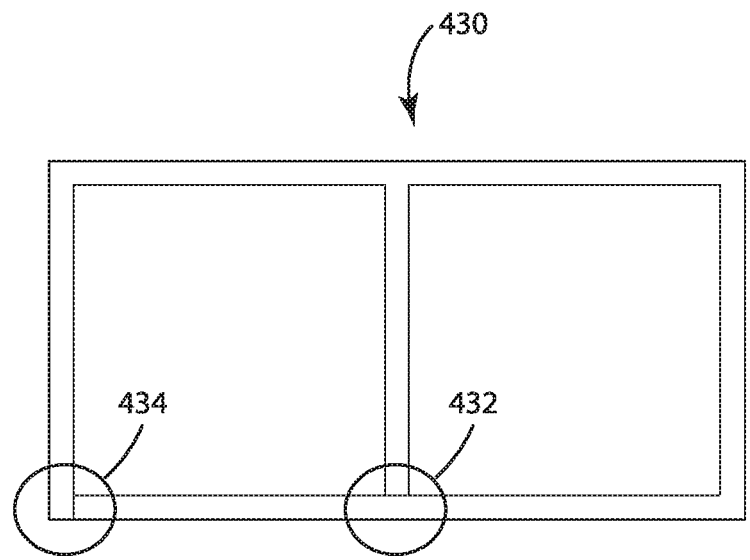
FIG. 9D shows a top view of a slice of the exemplary 3D model of FIG. 9A.
Figure 9E:
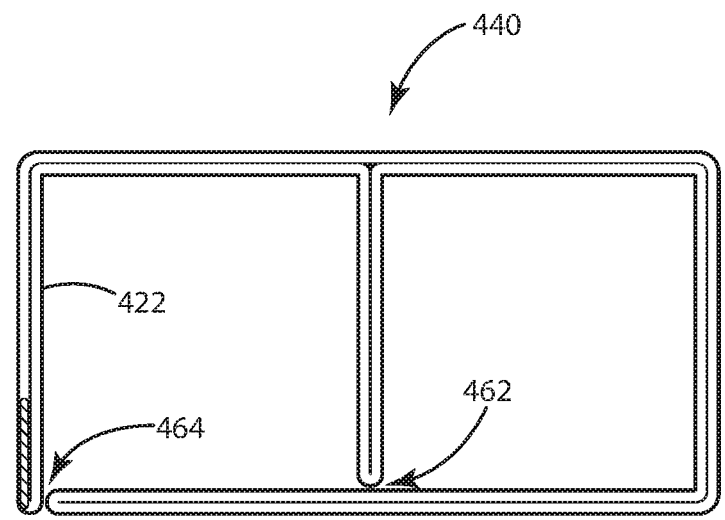
FIG. 9E shows a representative toolpath generated from the FIG. 9D slice of the exemplary 3D model in accordance with one embodiment of the present disclosure.

FIGS. 9A-E illustrate an overall toolpath for a three dimensional model of a figure eight geometry with zippering 400 (FIG. 9A), a first representative slice of the model 410 (FIG. 9B), a toolpath 420 corresponding to the first representative slice generated by an embodiment of the present disclosure (FIG. 9C), a second representative slice of the model 430 (FIG. 9D), a toolpath 440 corresponding to the second representative slice generated by an embodiment of the present disclosure (FIG. 9E). As shown in FIGS. 9A, 9B, and 9D, the model 400 includes zippered gaps 412, 414, 432, 434 such that alternating slices have gaps at different positions. Although FIG. 9A depicts the overall toolpath, it is drawn in a hybrid manner with aspects of the 3D model shown for illustration purposes. In particular, the gaps 412, 414, 432, 434 are illustrated to show the alternating nature of the model gaps within context of the of the resultant layer toolpaths they generate. The overall shape of the toolpath is generally the same layer to layer, but because the location of the cuts 412, 414, 432, 434 change with each layer, the resultant voids 452, 454, 462, 464 in the additive structure moves from layer to layer. For example, the gap at 412 on one layer leads to the toolpath extending from the bottom perimeter toward the top perimeter, but turning and doubling back before reaching the top perimeter. On an adjacent layer, the gap 432 leads to the toolpath extending from the top perimeter toward the bottom perimeter, but turning and doubling back before reaching the bottom perimeter. The gaps 414 and 434 swap positions layer to layer as well in the depicted embodiment. This alternating pattern of voids creates a zippering effect that services to make the resultant additively manufactured part stronger.

The above embodiments focus largely on modifying an existing model by adding gaps or creating a model with gaps such that a toolpath generated by slicer software will have an improved toolpath, such as a single continuous toolpath or a reduced number of isolated paths. In some embodiments, the toolpath improvement can be integrated into the slicer software directly without changing the model or creating a model with gaps. In essence, the slicer algorithm can be configured with a pathing generation process that emphasizes generation of a toolpath that is continuous (or at least reduces isolated paths). This process, or alternative embodiments, can also be utilized to assist in determining where to selectively insert gaps in an existing model or where to selectively place gaps when creating a new model to provide.

Some embodiments of the toolpath generation process can be defined in terms of two major phases. The first phase involves creation of a graph structure representative of the 3D model for which a toolpath is being generated and the second phase involves traversal of the graph to generate the toolpath for 3D printing the model.

To begin creating the graph structure, the contours of the graph can be derived or converted from the 3D model. The contours can be defined in terms of segments and vertices. Processes for doing this are generally well-known and therefore will not be covered in detail. Suffice it to say, an STL file, model, or other representation of an object can be defined as multiple contours. In general, this process typically involves slicing the model into a plurality of horizontal layers, determining the layer polygon(s), and defining a perimeter contour around the perimeter polygon stepping some distance in, typically relative to bead width, and defining inset contours. In many slicer algorithms, a single closed loop contour will be generated to represent the external geometry of the layer while internal geometry will include a number of additional isolated closed loop contours, for example, closed loops around voids. The contours generated can vary from application to application, often depending on not only the model for which the toolpath is being generated, but also the specific characteristics and settings of the 3D printer that will be printing the toolpath. For example, the thickness, number of, and arrangement of the contours can vary from application to application. Further, the contours can account for nozzle diameter, extrusion rate, filament type, and other factors.

Once all the contours are generated, the current embodiment of the present disclosure evaluates potential bridge location candidates. That is, the current embodiment seeks candidate locations to create bridges between the isolated contours. The candidate locations can be chosen according to application and based on a variety of factors. In many embodiments, the candidate bridge locations are sought prioritizing the ability to create a continuous toolpath for each layer that can traverse all connected contours. Creation of bridges will be discussed in more detail below. Candidate edges are those edges between two contours situated close enough spatially that they can support a bridge. Certain candidate locations can also be excluded from consideration based on the minimum distance between vertices in order to prevent bridges from being placed near corners. Certain candidate locations can also be excluded based on zippering criteria, if zippering is desired. If zippering is on, candidate edge pairs within a minimum spatial distance of a previous layer's bridges can be removed and the closest candidates within a minimum spatial distance of a previous layer's bridges are excluded and the closest candidates to the bridge from two layers ago can be prioritized (or certain candidates can be excluded and prioritized based on different zippering criteria).

Once the algorithm has identified all or a sufficient number of candidate bridge locations, the candidates can be organized into a weighted, undirected graph. Each node in the graph can represent a contour while each edge between the nodes can represent potential bridge locations between contours. Each edge can also be assigned a weight. A simple example is where the edge from the node that represents the perimeter contour to another node has a high weight, while all other edges have a low weight. In general, this causes the algorithm to prioritize placing bridges on the interior of the object and a single bridge on the exterior, which can be desirable in some applications.

Although the graph is undirected, it does have a shape. By virtue of how the contours are generated in the current embodiment (i.e. by taking the perimeter and stepping some distance in) contours do not intersect. As such, contours are either contained within one another or next to each other within some other contour. This leads to a parent-child or neighbor-neighbor relationship among nodes in the graph and creates a tree-like structure. In this way, the graph is essentially a forest of trees where each tree represents a solid piece of geometry. A fully connected piece of geometry is presented by a single root node and tree where traversal of the tree can produce a single path. For disconnected geometry, there will be multiple roots each with a single path and the algorithm can be configured to produce a reduced number of empty travels from one path to the next. Further the algorithm can be configured to position the empty travel at a suitable starting location and destination to reduce the number of empty travels, the amount of empty travel time, or some combination thereof.

With a forest of nodes setup, a minimum spanning tree algorithm, such as Kruskal's minimum spanning tree algorithm can be executed. In general, a minimum spanning tree refers to a fully connected graph of minimum weight. More specifically, such an algorithm identifies a subset of edges of the edge-weighted undirected graph that connects all the vertices together, without any cycles and with the minimum possible total edge weight. While the current embodiment employs a minimum spanning tree algorithm, it should be understood that different spanning tree algorithms can be utilized in other embodiments that do not necessarily connect all vertices or do not necessarily connect vertices with the minimum possible total edge weight. For the graph of the current embodiment of the present disclosure, the edge weights prioritize bridges on the interior of the object.

With the graph connected and because of the implicit tree-like structure, a depth first search (DFS), or other search algorithm, can be executed to traverse the tree and place bridges at the candidate bridge locations represented by the edges identified by the minimum spanning tree algorithm. Using the DFS and spanning tree results, the root node is followed to the innermost node identified by the spanning tree algorithm, placing bridges between the two node contours represented by the edges traversed. Upon reaching a dead-end, the algorithm steps back to the previous node, searches a branch node for another node in the spanning tree sub-set, and continues down again, placing bridges. Each time a bridge is placed between two contours, it can be selected from one of the available candidates, if there is more than one candidate. Other methods of the present disclosure can forgo the search and place bridges using the edges. That being said, the use of a DFS in connection with a spanning tree is one exemplary way in which to provide an order to the nodes such that the method starts at the perimeter and moves inwards similar to a typical build with disconnected contours.

The criteria for selection of a particular candidate bridge location can vary depending on the application and on a number of different factors. For example, in some embodiments, the candidate bridge locations can be sorted and prioritized in order from the center of a segment towards the vertices at either end, which can help to keep bridges way from corners. The criteria for selection of a particular candidate bridge location can be configurable. While in some embodiments the method can be configured to prioritize bridge placement toward the center of a segment. In other embodiments, the method can be configured for bridge placement near the edges. The particular configuration can be selected for a variety of reasons such as aesthetics, bond strength considerations, and spacing, e.g. to reduce the chance of overlap between non-zipper bridges from one layer to the next. Further, upon placing a bridge at one of the candidate bridge locations, that candidate bridge location can be removed from any other common edges. For example, each time a bridge is placed between two contours, all candidate bridge locations between those two contours can be excluded from the list of candidate bridge locations. In other embodiments, there may not be any sorting or prioritization of certain edges. For example, there may be a fixed criteria or set of criteria for placing bridges between contours.

A bridge refers to a toolpath between two isolated contour paths. Bridges can be created in a variety of different ways. The bridge creation/placement selection methodology can vary from application to application based on a number of different criteria. By way of example, a bridge between contours 2 and 3 can be created by disconnecting contour 2 from itself, disconnecting contour 3 from itself, connecting a first end of disconnected contour 2 to a first end of disconnected contour 3, and connecting a second end of disconnected contour 2 to a second end of disconnected contour 3. The resultant bridge connection is visually similar to the toolpath generated by inserting a cut 212 show in FIGS. 7B-7C. Alternatively, a bridge can be described as breaking segments on the contours and inserting additional vertices. Those additional vertices are connected start/start and end/end to make the bridge. Bridge placement is discussed below in more detail with respect to a final recursive step.

With the graph complete, phase two can begin, traversal of the graph to generate the toolpath for 3D printing the model. In essence, a recursive walk down each tree-like structure can be performed. The traversal can begin by iterating over the vertices for a perimeter contour, which represents a root node in the graph. If a segment hosts a bridge, the bridge can be inserted into a final toolpath, then the process can continue recursively into the new contour. To keep vertices orderly, the process can be divided into two logical cases. Where a bridge is inserted between contours having a parent-child relationship, the ordering of the subsequent vertices can be reversed. Where a bridge is inserted and the contours have a neighbor-neighbor relationship, the order of the vertices is maintained. The recursion continues until all vertices have been iterated over and connected via bridges. To the extent there is disconnected geometry somewhere, the algorithm can move to the next root and begin the recursion process again. Thus, the algorithm can provide a path of minimal travels if the geometry is disconnected or a single path if the geometry is connected.

Figure 10:
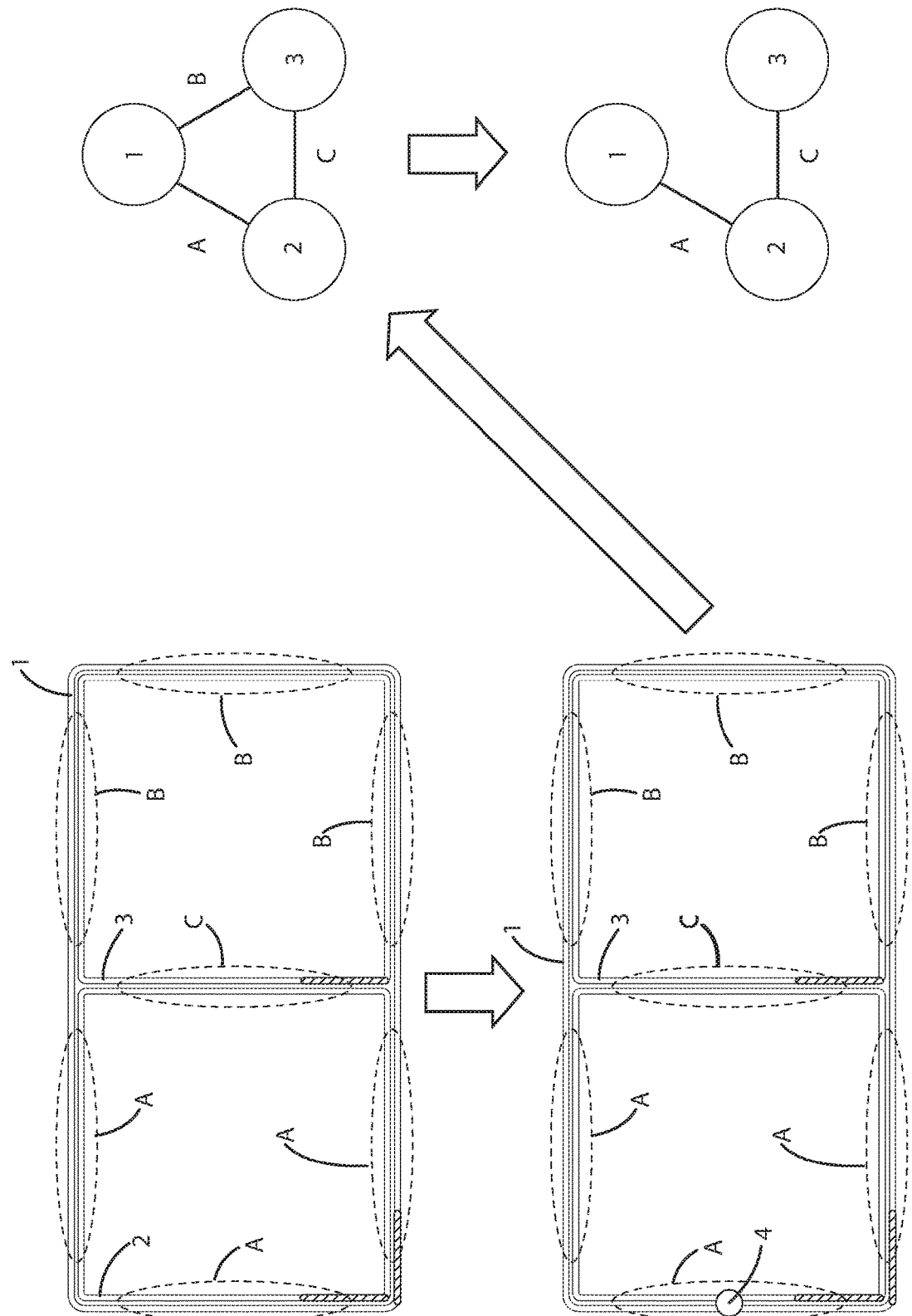
FIG. 10 shows a representative flow diagram illustrating a slicing algorithm in accordance with embodiments of the present disclosure.
Figure 11:
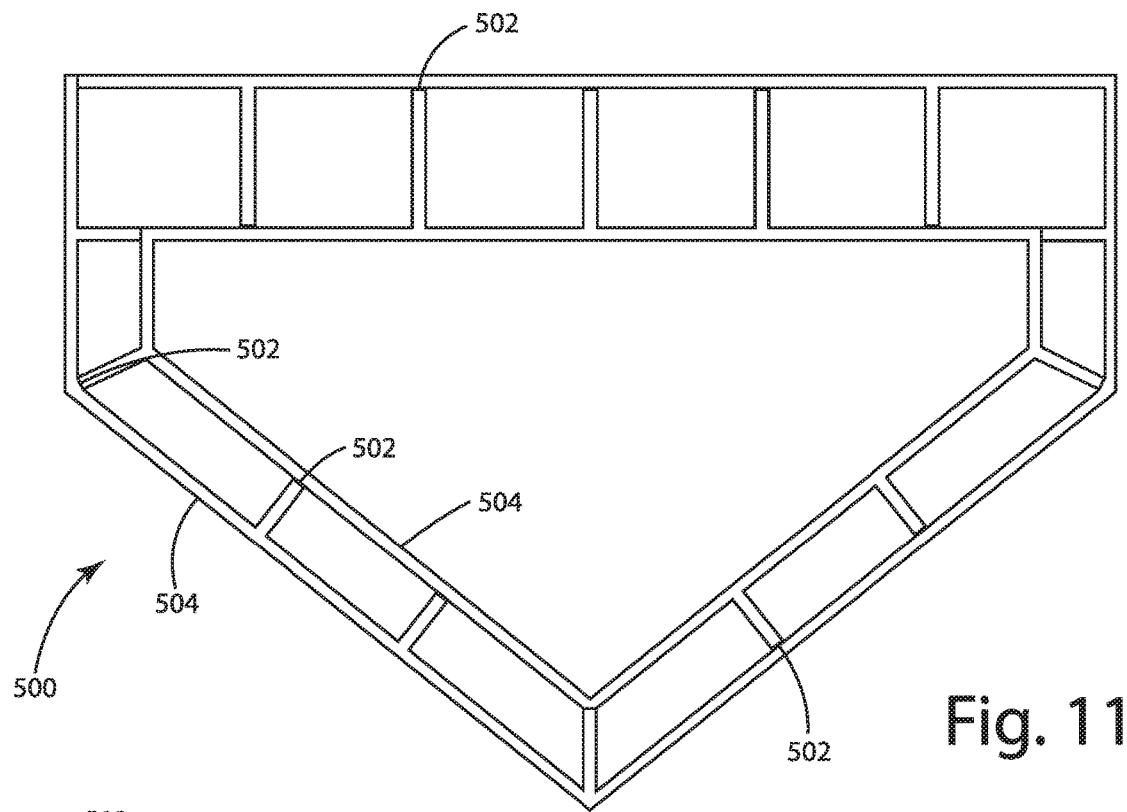
FIG. 11 shows an exemplary 3D model with gaps inserted at selected intersections.

An example of one embodiment of the pathing algorithm will now be described in detail. Referring to FIG. 10, a slice of a model converted into three contours is illustrated: a perimeter contour 1, an inner left square contour 2, and an inner right square contour 3. Each of the contours can loosely represent a planned bead to be extruded by a 3D printer.

The process includes evaluating candidate bridge locations A, B, C between the different contours 1, 2, 3. Because the contours are relatively straight and extend adjacent to each other for significant lengths, there are numerous candidate bridge locations A, B, C between each contour that can host bridges. In alternative embodiments with different geometries, the candidate bridge locations may be different. The candidate bridge locations A, B, C of this particular example exclude line segment ends to ensure bridges are located distal from end points. Accordingly, the shaded regions A, B, C covering multiple contours, roughly show candidate bridge locations.

The candidate bridge locations can be modified by user options. One such option, available in some embodiments, is zippering where certain candidate bridge locations may be excluded or given preferential priority according to zippering criteria. Where zippering is enabled, the method may include tracking the position of bridges in other layers, especially adjacent or proximal layers. For example, the method can track the location of toolpath bridges in the previous layer, such as bridge 4, shown on the left-hand side between contour 1 and 2. Based on this information and the zippering criteria, the candidate bridge location A can be excluded from the list of candidates for this layer. Further, the candidate bridge location A can be prioritized or pre-selected for the subsequent layer to guarantee zipper placement. The geometry may not be identical layer to layer and the zippering criteria may account for that by adjusting the exclusion and priority for candidate bridge locations using threshold zones within a particular distance.

Next, a graph can be constructed with the contours as nodes and the candidate bridge locations as edges between the nodes where an edge between nodes represents a candidate bridge location spanning those particular nodes. Due to how a model is sliced, the resultant graph is a tree with the perimeter contour as its root and an unbound number of siblings per level of the tree. This gives rise to two types of nodal relationships: parent-child and neighbor-neighbor. As depicted in FIG. 10 the root node 1 has two children 2, 3 by virtue of the shared edges between.

The graph is undirected. Each node represents one of the contours 1, 2, 3 and can include relevant geometric data. Each edge A, B, C represents possible bridge connections between the two contours represented by the nodes being connected by the edge. Each edge can include an associated list of appropriate bridge locations, e.g. particular segments where bridges can be positioned, as well as a weight for each edge that can be user defined or defined according to an algorithm. In one embodiment, the weight can be configured to reduce the number of bridges placed on the perimeter. In the exemplary embodiment depicted in FIG. 10, edge A and B may be assigned a weight of 100 while edge C may be assigned a weight of 1.

Kruskal's algorithm, or another algorithm, can be utilized to construct a minimum spanning tree. That is, a tree that connects to all nodes with minimal cost according to edge weight. Given the weights in this exemplary embodiment, the algorithm can either select edge A or B and Edge C for a total cost of 101. Tie breakers are implicit as part of Kruskal's algorithm and occur by virtue of the evaluation order of the nodes/edges in the graph. In other embodiments, other types of tiebreakers can be utilized. In the depicted example, edge A and C are selected—and all other, unselected, edges are removed from the tree.

The graph can be traversed using a depth-first search where, beginning with the root node, as many parent-child relationships as possible are traversed before evaluating any neighbor-neighbor relationships. Practically, this means the tree is traversed as inward as possible when moving from node to node. From a geometry perspective, because the nodes represent contours and the parent-child relationship signifies that a child node is a contour contained entirely within the parent node contour, this means that as the tree is traversed, the algorithm is moving from the perimeter geometry contour to the inner-most contour, i.e. the contour surrounded by the most other contours. Referring to the simple example illustrated in FIG. 10, the algorithm begins with node 1 identifies that edge A as part of the minimum spanning tree. As the algorithm travels across edge A, the process can include selecting a particular candidate bridge location from those associated with edge A. The process can prioritize selection of a candidate bridge location using pre-defined criteria, such as the longest segment available within the candidate bridge location set A. That is, a particular sub-region or segment that has the most overlapping area for a candidate bridge location can be prioritized. Ties between segments can be broken randomly or according to a set of tying criteria. Once the candidate bridge location is decided for the A region the process can be performed recursively moving from node 2 to node 3 via edge C.

As segments are selected, a particular selection for the bridge on the selected segment or sub-region can be selected according to pre-defined criteria, randomly, or essentially in any other way. Ties can be broken randomly or according to a set of tying criteria. Further, if the bridge is in common with any other segments, it can be removed as an option to ensure a single location does not host multiple bridges.

With the connected path, a recursive algorithm can traverse the contours in the same order as the tree to generate the toolpath. The algorithm can include recording either the appropriate vertex that makes up the original contour or the vertices for a bridge. When the algorithm encounters a bridge, the algorithm can recurse to the next contour and repeat the process. The process can continue until all vertices are exhausted leaving a single path or path with a reduced number of isolated paths. For the FIG. 10 example, the resultant toolpath will be similar to that of FIG. 8C, except that the bridges will be further from the intersections due to the priorities for placing bridges away from corners and intersections.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Such components can be physically configured in any suitable manner, such as by mounting them to one or more circuit boards, or arranging them in other manners, whether combined into a single unit or distributed across multiple units. Similarly, steps of a method or process described herein may be embodied directly in hardware, in a software module executed by a processor, or in a combination thereof. A software module may reside in random access memory (RAM), flash memory, read-only memory (ROM), erasable programmable read-only memory (EPROM), electrically erasable programmable read-only memory (EEPROM), registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although particular embodiments have been described of the present invention, it is not intended that such references be construed as limitations upon the scope of this invention except as set forth in the following claims.

The embodiments of the invention in which an exclusive property or privilege is claimed are defined as follows:

1. A method of generating a toolpath for additively manufacturing an object, the method comprising:
    obtaining a 3-D digital representation of the object;
    slicing the 3-D digital representation of the object into a plurality of layers, one of the plurality of layers including a plurality of isolated contours including a perimeter contour and a plurality of inset contours surrounded by the perimeter contour;
    identifying a plurality of regions between the isolated contours including candidate bridge or candidate gap locations;
    generating a graph using a processor where nodes of the graph represent the plurality of isolated contours and edges of the graph represent candidate bridge or gap locations between the isolated contours, wherein a root node represents the perimeter contour and each of the nodes connect to at least one other node in a parent-child relationship or sibling-sibling relationship;
    assigning, using a processor, a bridge or gap edge bias weight to each of the edges of the graph such that the bridge or gap edge bias weights vary as a function of node depth in the graph;
    automatically generating a toolpath, using a processor, by 1) selecting a subset of the edges representing candidate bridge or gap locations that connect all of the nodes without any cycles based on the bridge or gap edge bias weights and 2) beginning with the root node and based on the selected subset of edges, automatically selecting a bridge location from the candidate bridge or gap locations between the isolated contours for each of the selected subset of edges, wherein the toolpath includes the nodes representing each of the isolated contours, bridges across the selected bridge locations to connect all of the isolated contours without any cycles based on edge bias weights, and gaps at the remaining candidate bridge or gap locations between the isolated contours, wherein the toolpath is continuous and traversable without traversing a bridge location multiple times; and
    additively manufacturing the object using a 3D printer by printing along the generated toolpath.

2. The method of claim 1 including excluding certain candidate bridge locations based on zippering criteria.

3. The method of claim 1 including prioritizing certain candidate bridge locations based on zippering criteria.

4. The method of claim 1 wherein the gap edge weights of outer edge contours are substantially greater than the gap edge weights of inner edge contours, and the subsets of the edges are selected based on a minimum spanning tree algorithm and wherein a depth first search algorithm is used to traverse the subset of the edges for selecting the bridge location for each of the selected subset of edges.

5. A method of creating additive manufacturing instructions for an object, the method comprising:
    slicing, with a slicer, a model of the object into a plurality of slices for additively manufacturing the object, a slice including a plurality of contours each including a plurality of vertices and a plurality of edges, wherein the plurality of contours include an isolated perimeter path surrounding a plurality of isolated inset paths;
    identifying a plurality of candidate bridge or candidate gap locations between the plurality of contours;
    generating a graph using a processor where nodes of the graph represent the plurality of contours and edges of the graph represent the candidate bridge or candidate gap locations between the plurality of contours, wherein a root node represents the isolated perimeter path and other nodes represent the plurality of isolated inset paths, wherein each of the nodes connect to at least one other node in a parent-child relationship or sibling-sibling relationship;
    assigning, using a processor, a bridge or gap edge bias weight to each of the edges of the graph such that the bridge or gap edge bias weights vary as a function of node depth in the graph;
    automatically generating a toolpath from the graph, using a processor, by beginning with the root node and based on the selected subset of edges and their bridge or gap edge bias weights selecting, with a processor, a subset of the plurality of edges from the graph that represent bridge locations from the plurality of candidate bridge or candidate gap locations between the plurality of contours such that after forming bridges at the selected locations none of the plurality of contours will be isolated, wherein all of the nodes in the graph connect without any cycles;
    wherein the toolpath includes the nodes representing each of the contours, bridges between the contours at the selected bridge locations to connect all of the contours without any cycles based on edge bias weights, and gaps at the remaining candidate bridge or candidate gap locations between the plurality of contours, wherein the toolpath is continuous and traversable without traversing a bridge location multiple times;
    storing additive manufacturing instructions in memory based on the generated toolpath; and
    additively manufacturing the object using a 3D printer by printing along the generated toolpath.

6. The method of claim 5 wherein the forming bridges between the plurality of contours includes inserting a first gap between a first contour to provide two disconnected vertices of the first contour, inserting a second gap between a second contour to provide two disconnected vertices of the second contour, connecting one of the disconnected vertices of the first contour with one of the disconnected vertices of the second contour, connecting the other disconnected vertex of the first contour with the other disconnected vertex of the second contour.

7. The method of claim 5 including counting a number of paths emanating from each vertex of the plurality of vertices of the plurality of contours and forming bridges such that the number of paths emanating from each vertex in the toolpath is an even number of paths.

\* \* \* \* \*